United States Patent
Prakash et al.

(10) Patent No.: US 7,978,677 B2
(45) Date of Patent: Jul. 12, 2011

(54) METHODS AND APPARATUS FOR USING CONTROL VALUES TO CONTROL COMMUNICATIONS PROCESSING

(75) Inventors: Rajat Prakash, San Diego, CA (US); Fatih Ulupinar, San Diego, CA (US); Gavin Horn, La Jolla, CA (US); Paul E. Bender, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 920 days.

(21) Appl. No.: 11/759,918

(22) Filed: Jun. 7, 2007

(65) Prior Publication Data

US 2007/0286126 A1     Dec. 13, 2007

Related U.S. Application Data

(60) Provisional application No. 60/812,053, filed on Jun. 7, 2006.

(51) Int. Cl.
*H04L 12/26* (2006.01)
*H04W 4/00* (2009.01)
*H04B 7/212* (2006.01)

(52) U.S. Cl. ......... 370/349; 370/252; 370/328; 370/332

(58) Field of Classification Search .......... 370/252–253, 370/310, 310.2, 313, 328–332, 349, 351–356, 370/392–394, 471, 314, 334–338, 341–345, 370/347, 473–475, 902, 912–913; 455/418, 455/423–425, 513, 517, 550.1, 556.2, 561, 455/562.1

See application file for complete search history.

(56) References Cited

U.S. PATENT DOCUMENTS

| | | | |
|---|---|---|---|
| 6,556,556 B1 * | 4/2003 | Sen et al. | 370/342 |
| 6,778,558 B2 * | 8/2004 | Balachandran et al. | 370/470 |
| 6,937,573 B2 * | 8/2005 | Chan et al. | 370/252 |
| 7,050,397 B2 | 5/2006 | Cheng et al. | |

(Continued)

FOREIGN PATENT DOCUMENTS

RU     2224377     2/2004

(Continued)

OTHER PUBLICATIONS

"Project No. 3-4875-RV1-AD2, proposed addendum of a TIA Standard, High Rate Packet Data Air Interface. (if approved, to be published as TIA-856-A-2); SP-3-4875-RV1-AD2" EIA/TIA Drafts, Telecommunications Industry Association, Arlington, VA, May 5, 2006.

(Continued)

*Primary Examiner* — Meless N Zewdu
(74) *Attorney, Agent, or Firm* — Milan Patel; Darren M. Simon

(57) ABSTRACT

Methods and apparatus for tunneling packets between remote and serving Access points for delivery to an access terminal (AT) are described. Methods and apparatus for communicating control values and/or information in addition to information to be delivered to an AT over an airlink are also described. An AT uses the received control information to recover communicated packets. Some features support the use of various headers and/or indicators in the headers, e.g., RLP and/or Packet Correlation Protocol (PCP) headers, which may be used to control routing of communicated payloads to an RLP processing module corresponding to an AP which was the source of the communicated payload.

28 Claims, 12 Drawing Sheets

U.S. PATENT DOCUMENTS

| | | | |
|---|---|---|---|
| 7,085,291 B2* | 8/2006 | Zhang et al. | 370/473 |
| 7,308,260 B2* | 12/2007 | Mandayam et al. | 455/435.1 |
| 7,484,120 B2* | 1/2009 | Fong et al. | 714/18 |
| 7,586,882 B2* | 9/2009 | Sivalingham et al. | 370/335 |
| 2001/0004355 A1* | 6/2001 | Galyas et al. | 370/329 |
| 2003/0035441 A1* | 2/2003 | Cheng et al. | 370/474 |
| 2005/0271014 A1 | 12/2005 | Gillies et al. | |
| 2005/0281243 A1* | 12/2005 | Horn et al. | 370/345 |
| 2006/0002465 A1 | 1/2006 | Raveendran et al. | |
| 2006/0187955 A1* | 8/2006 | Rezaiifar et al. | 370/464 |
| 2006/0209694 A1 | 9/2006 | Chandhok et al. | |
| 2007/0071000 A1* | 3/2007 | Ulupinar et al. | 370/389 |
| 2007/0101120 A1 | 5/2007 | Patel et al. | |
| 2007/0153722 A1* | 7/2007 | Gillies et al. | 370/328 |
| 2007/0165643 A1* | 7/2007 | Mooney et al. | 370/394 |
| 2007/0286206 A1 | 12/2007 | Horn et al. | |
| 2008/0008111 A1 | 1/2008 | Prakash et al. | |

FOREIGN PATENT DOCUMENTS

| | | |
|---|---|---|
| WO | 99059364 | 11/1999 |
| WO | 00028714 | 5/2000 |
| WO | WO2006007025 | 1/2006 |

OTHER PUBLICATIONS

Airvana: "Commercial-Grade VoIP over 1xEV-DO Rev A" Internet Citation, Feb. 8, 2005, pp. 15-16.

International Search Report—PCT/US07/070624—International Search Authority, European Patent Office—Aug. 22, 2008.

3GPP2: "3GPP2 C.S0084-004-0 Version 1.0 Apr. 2007 Application Layer for Ultra Mobile Broadband (UMB) Air Interface Specification" 3GPP2. [Online] Apr. 2007, pp. 1-3-10, XP002501324 Retrieved from the Internet:.

Written Opinion—PCT/US07/070624, International Search Authority, European Patent Office, Aug. 22, 2008.

\* cited by examiner

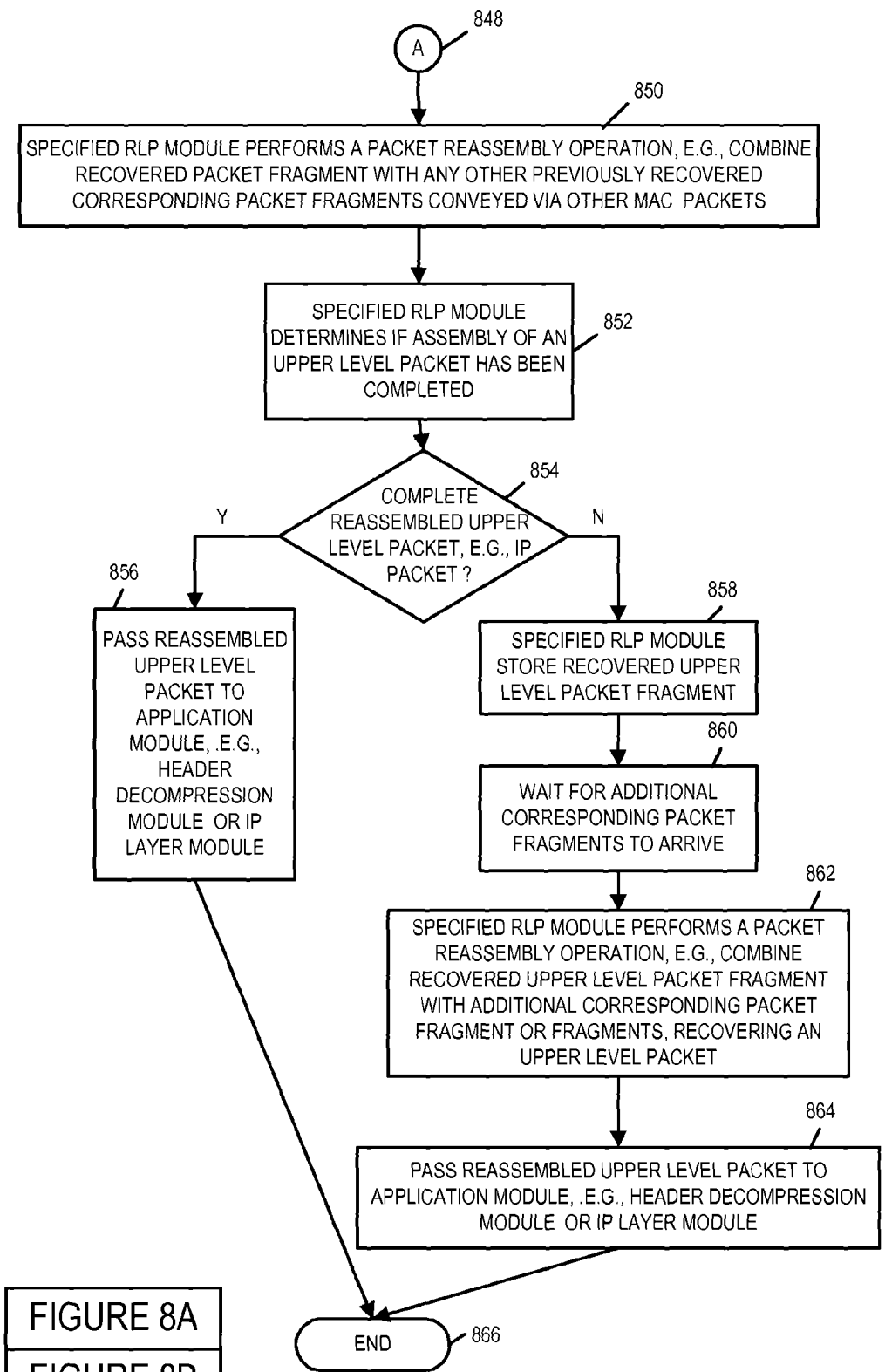

METHODS AND APPARATUS FOR USING CONTROL VALUES TO CONTROL COMMUNICATIONS PROCESSING

RELATED APPLICATIONS

The present application claims the benefit of U.S. Provisional Patent Application Ser. No. 60/812,053 filed on Jun. 7, 2006, titled "A METHOD AND APPARATUS FOR USING REPROCESS BIT TO DELIVER DATA" which is hereby expressly incorporated by reference.

FIELD

Various embodiments are directed to methods and apparatus for communications, and more particularly to methods and apparatus related to using control values to control communications processing.

BACKGROUND

Wireless communications systems often include a plurality of access points (APs) and/or other network elements in addition to access terminals, e.g., mobile or other end node devices. In many cases access terminals normally communicate with access points via wireless communications links while other elements in the network, e.g., APs, generally communicate with one another via non-air links, e.g., fiber, cable or wire links.

As an Access Terminal (AT) moves in a system, and/or as airlink conditions change, the access terminal may loose or terminate a connection with an AP and may establish and/or maintain a connection with another AP. As a result, an AP which had an airlink connection with an AT may end up in a situation where it has undelivered packets which are to be communicated to an AT with which it no longer has a connection.

APs often subject IP packets and/or other higher level packets to fragmentation prior to transmission over an airlink. RLP (Radio Link Protocol) processing may be used to perform this function and/or to generate header which can be used in reconstructing the higher level packets from, e.g., smaller MAC packets, communicated over an airlink. Different access nodes may implement, e.g., the fragmentation function, slightly differently. Accordingly, in many embodiments, it may important that ATs receiving an RLP packet be able to identify the AP which was responsible for generating the RLP packets to begin with so that the packets can be processed by a corresponding RLP module and the higher level packet, in the case of fragmentation, reconstructed therefrom.

It should be appreciated that there is a need for methods and/or apparatus which support the communications of packets between an AP which is remote to an AT and an AP which is serving the AT and has an active airlink connection with the AT that can be used to deliver packets. There is also a need for methods and/or apparatus which can be used to communicate sufficient control information to allow an AT to apply the proper processing, e.g., RLP processing, to packets received over an airlink.

SUMMARY

Some features are directed to methods and apparatus which can be used to tunnel packets between a remote and serving Access Point for delivery to an access terminal (AT). Other features are directed to communicating control values and/or information in addition to information to be delivered to an AT over an airlink. Some features support the use of various headers, e.g., RLP and/or Packet Correlation Protocol (PCP) headers, which may be used to control routing of communicated payloads to an RLP processing module corresponding to an AP which was the source of the communicated payload.

An exemplary method of operating an access terminal in accordance with various embodiments, comprises: examining an RLP header of an RLP packet to determine if a reprocess indicator value in said RLP header has been set; and if it is determined that said reprocess indicator has been set: i) passing a payload corresponding to said indicator value to an addressing layer module; and ii) operate addressing layer module to deliver the payload corresponding to said indicator value to an RLP module corresponding to an address value included in said RLP packet with said reprocess indicator. An exemplary access terminal, in accordance with various embodiments, comprises: a first RLP payload processing module corresponding to a first access point; a second RLP payload processing module corresponding to a second access point; an addressing module for forwarding packet payloads to one of said RLP payload processing modules based on address information communicated to said addressing module; a header processing module for determining, based on an indicator value included in a header, whether the header includes an address used for routing an RLP packet payload and forwarding the packet payload to said addressing module when the indicator value indicates that an address used for routing RLP packet payloads is included.

An exemplary method of operating a first access point, in accordance with various embodiments, comprises: receiving a radio link protocol packet, via an inter-access point tunnel, the received radio link protocol packet including information directed to an access terminal; determining if the received radio link packet fits in a MAC packet; if it is determined that the received radio link packet fits in a MAC packet: generating a MAC packet including the received radio link packet; and transmitting the generated MAC packet to the access terminal over an air link between said first access point and said access terminal. An exemplary access point, in accordance with some embodiments comprises: a tunnel interface module for receiving tunneled packets from another access point; a packet fragmentation determination module for determining if packet fragmentation is to be performed on the content of a tunneled packet; an RLP header generation module coupled to said packet fragmentation module for generating an RLP header including a value indicating the presence of an address to be used for routing an RLP packet payload to an RLP module; and a wireless transmitter for transmitting a packet over an airlink including an RLP header generated by said RLP header generation module and at least a portion of a tunneled packet.

An exemplary method of operating a first access point, in accordance with some embodiments, comprises: receiving a packet to be communicated to an access terminal; determining if the first access point is remote to the access terminal to which said received packet is to be communicated; if it is determined that the first access point is remote to the access terminal to which said received packet is to be communicated: i) generating an RLP header; ii) generating a tunnel header including a sender address corresponding to said first access point; and iii) transmitting the received packet with the RLP header and tunnel header to a second access point via a communications tunnel. An exemplary first access point, which is coupled to a second access point, said second access point having an airlink connection with an access terminal, in some embodiments, comprises: a remote determination means for determining if the first access point does not have an airlink connection with an access terminal to which a packet is to be communicated; remote device packet processing means for processing packets received from a remote access point, said remote device packet processing means including: i) RLP header generation means for generating an RLP header including a value set to indicate that an address to be used for routing an RLP payload is not included in the generated RLP packet header; ii) inter-access point tunnel header generation means for generating a tunnel packet header used for tunneling an RLP packet including said packet to be communicated to said second access point for transmission to said access terminal.

While various embodiments have been discussed in the summary above, it should be appreciated that not necessarily all embodiments include the same features and some of the features described above are not necessary but can be desirable in some embodiments. Numerous additional features, embodiments and benefits are discussed in the detailed description which follows.

BRIEF DESCRIPTION OF THE DRAWINGS

FIG. 4 illustrates an exemplary network including a centralized AN architecture and an AT.

DETAILED DESCRIPTION

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include World Interoperability for Microwave Access (WiMAX), infrared protocols such as Infrared Data Association (IrDA), short-range wireless protocols/technologies, Bluetooth® technology, ZigBee® protocol, ultra wide band (UWB) protocol, home radio frequency (HomeRF), shared wireless access protocol (SWAP), wideband technology such as a wireless Ethernet compatibility alliance (WECA), wireless fidelity alliance (Wi-Fi Alliance), 802.11 network technology, public switched telephone network technology, public heterogeneous communications network technology such as the Internet, private wireless communications network, land mobile radio network, code division multiple access (CDMA), wideband code division multiple access (WCDMA), universal mobile telecommunications system (UMTS), advanced mobile phone service (AMPS), time division multiple access (TDMA), frequency division multiple access (FDMA), orthogonal frequency division multiple access (OFDMA), global system for mobile communications (GSM), single carrier (1X) radio transmission technology (RTT), evolution data only (EV-DO) technology, general packet radio service (GPRS), enhanced data GSM environment (EDGE), high speed downlink data packet access (HSPDA), analog and digital satellite systems, and any other technologies/protocols that may be used in at least one of a wireless communications network and a data communications network.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

Figure 1:
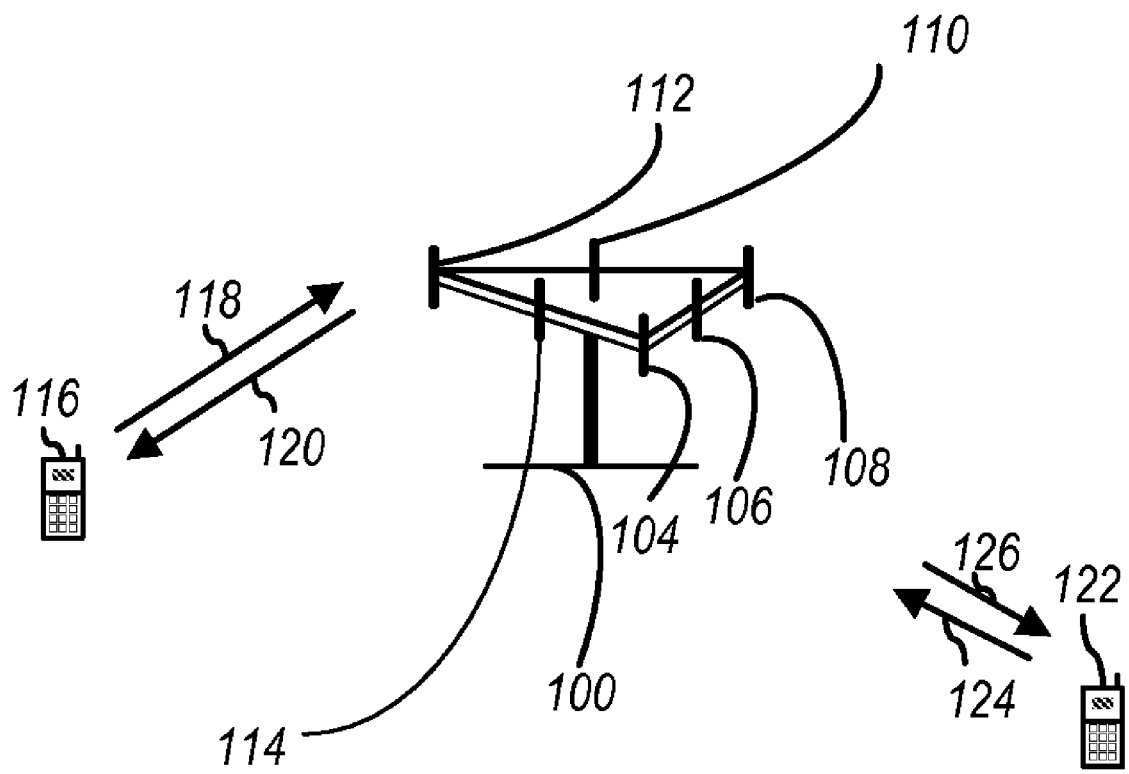
FIG. 1 illustrates a multiple access wireless communication system according to one embodiment.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequencies for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector of the areas covered by access point 100.

In communication over forward links 120 and 126, the transmitting antennas of access point 100 utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access node, a Node B, a base station or some other terminology. An access terminal may also be called an access device, user equipment (UE), a wireless communication device, terminal, wireless terminal, mobile terminal, mobile node, end node or some other terminology.

Figure 2:
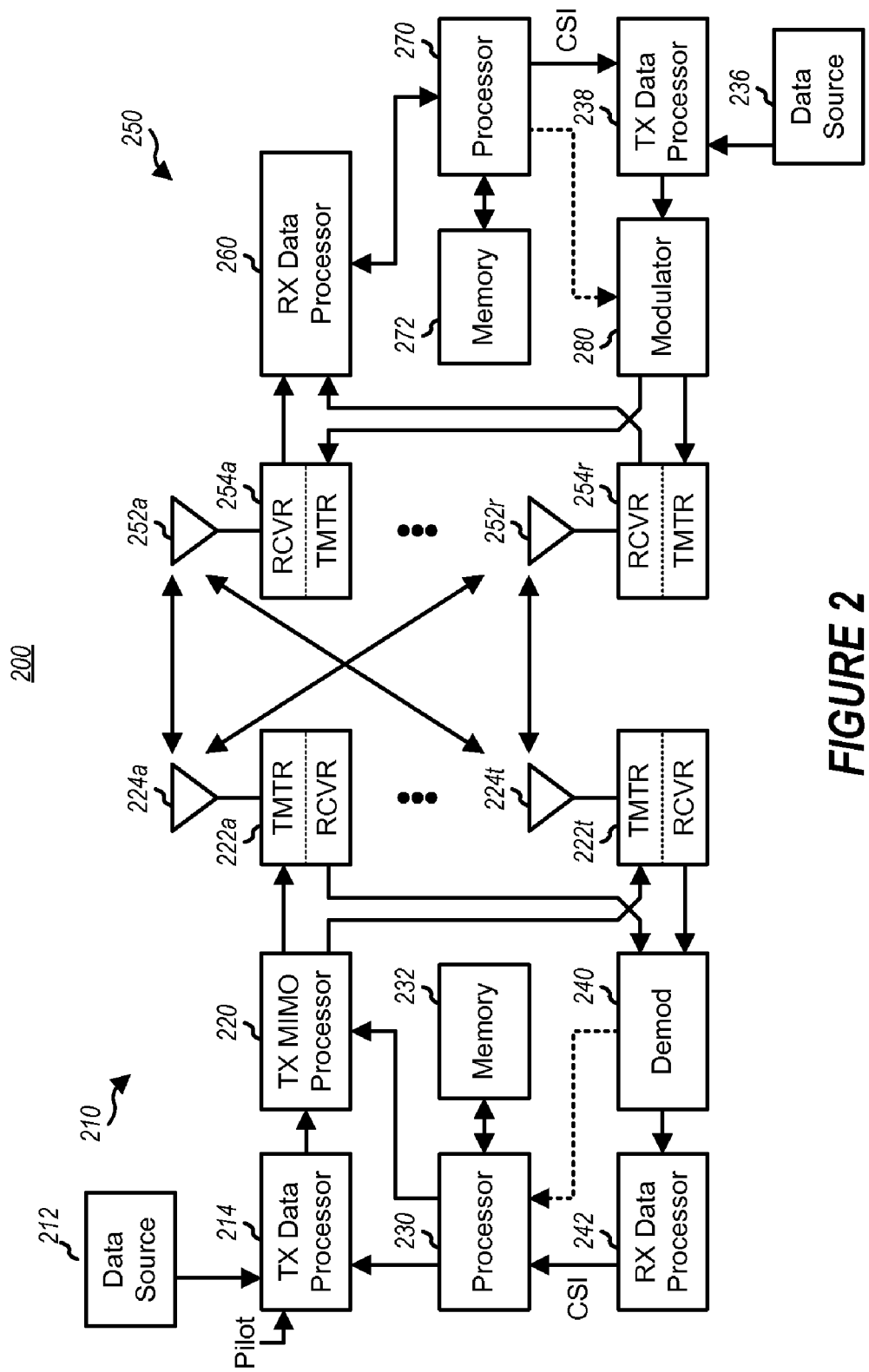
FIG. 2 is a block diagram of an exemplary communication system.

FIG. 2 is a block diagram of an embodiment of an exemplary access point 210 and an exemplary access terminal 250 in a MIMO system 200. At the access point 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for each of the data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter (222a, ..., 222t) receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At access terminal 250, the transmitted modulated signals are received by $N_R$ antennas 252a through 252r and the received signal from each antenna 252 is provided to a respective receiver (RCVR) 254a through 254r. Each receiver (254a, ..., 254r) conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers (254a, ..., 254r) based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted, via antennas (252a, 252r), respectively, back to access point 210.

At access point 210, the modulated signals from access terminal 250 are received by antennas 224, conditioned by receivers 222, demodulated by a demodulator 240, and processed by a RX data processor 242 to extract the reverse link message transmitted by the receiver system 250. Processor 230 then determines which pre-coding matrix to use for determining the beamforming weights, then processes the extracted message.

Memory 232 includes routines and data/information. Processors 230, 220 and/or 242 execute the routines and uses the data/information in memory 232 to control the operation of the access point 210 and implement methods. Memory 272 includes routines and data/information. Processors 270, 260, and/or 238 execute the routines and uses the data/information in memory 272 to control the operation of the access terminal 250 and implement methods.

In an aspect, SimpleRAN is designed to significantly simplify the communications protocols between the backhaul access network elements in a wireless radio access network, while providing fast handoff to accommodate the demands of low latency applications, such as VOIP, in fast changing radio conditions.

In an aspect, the network comprises access terminals (AT) and an access network (AN).

The AN supports both a centralized and distributed deployment. The network architectures for the centralized and distributed deployments are shown in FIG. 3 and FIG. 4 respectively.

Figure 3:
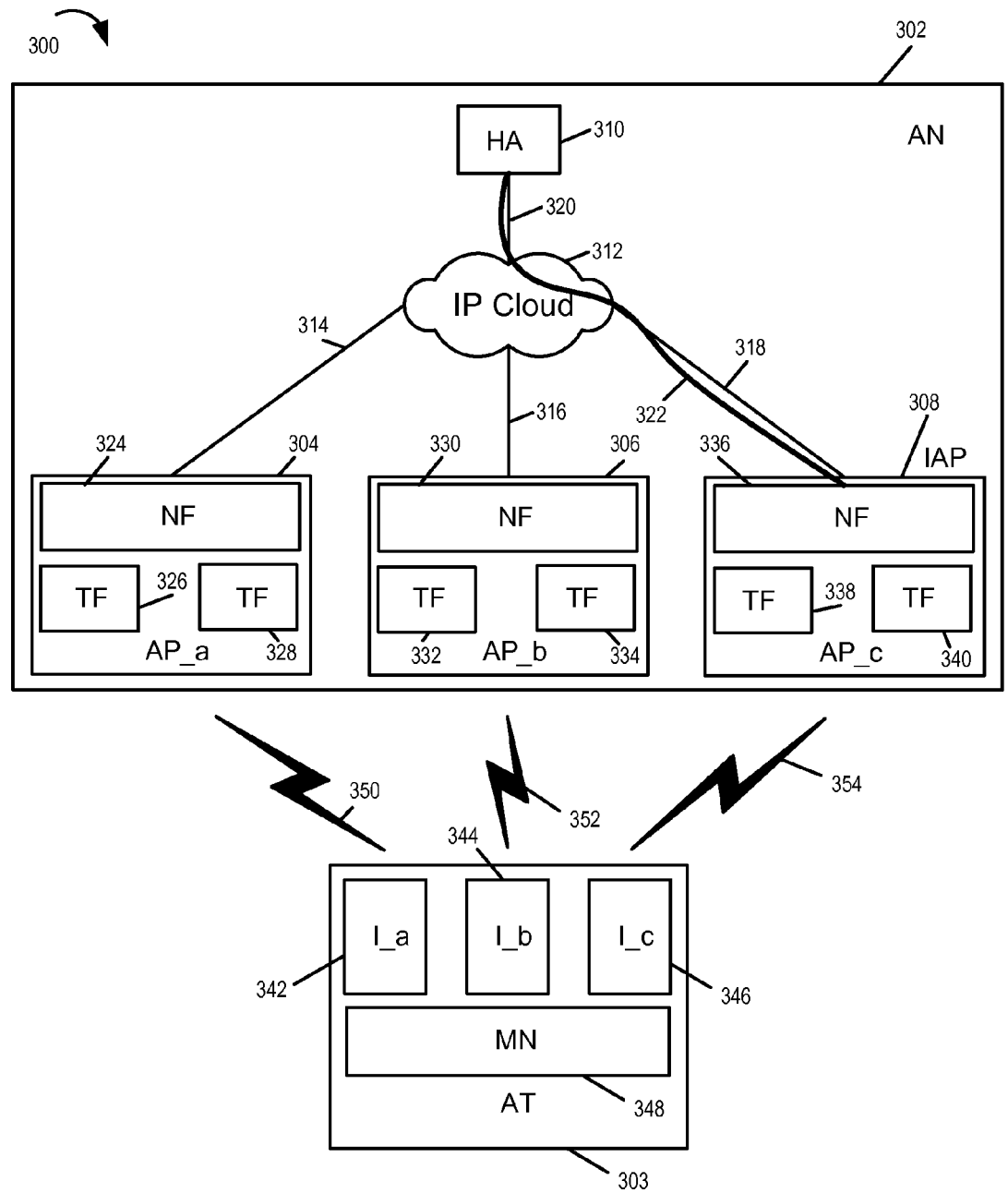
FIG. 3 illustrates an exemplary network including a distributed access network (AN) architecture and an access terminal (AT).
Figure 4:
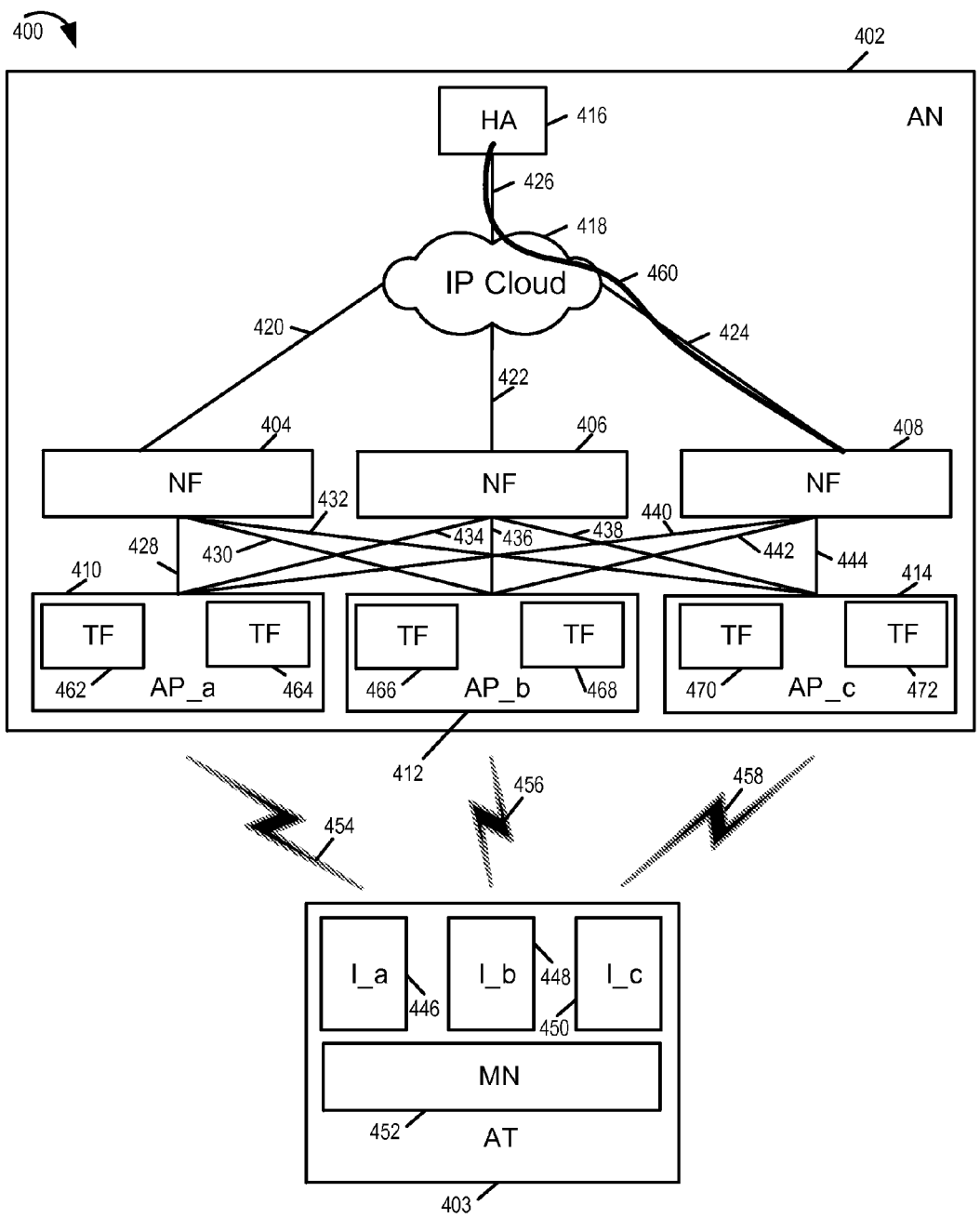

FIG. 3 illustrates an exemplary network 300 including a distributed AN 302 and an AT 303.

In a distributed architecture shown in FIG. 3, the AN 302 comprises access points (AP) and home agents (HA). AN 302 includes a plurality of access points (APa 304, APb 306, APc 308) and home agent 310. In addition, AN 302 includes an IP cloud 312. The APs (304, 306, 308) are coupled to the IP cloud via links (314, 316, 318), respectively. The IP cloud 312 is coupled to the HA 310 via link 320.

An AP includes a:

Network function (NF):

One per AP, and multiple NFs can serve a single AT.

A single NF is the IP layer attachment point (IAP) for each AT, i.e., the NF to which the HA forwards packets sent to the AT. In the example of FIG. 4, NF 336 is the current IAP for AT 303, as shown by the line 322 in FIG. 4.

The IAP may change (L3 handoff) to optimize routing of packets over the backhaul to the AT.

The IAP also performs the function of the session master for the AT. (In some embodiments, only the session master can perform session configuration, or change the session state.)

The NF acts as the controller for each of the TFs in the AP and performs functions like allocating, managing and tearing down resources for an AT at the TF.

Transceiver functions (TF) or sector:

Multiple per AP, and multiple TFs can serve a single AT.

Provides the air interface attachment for the AT.

Can be different for the forward and reverse links.

Changes (L2 handoff) based on radio conditions.

In AN 302 APa 304 includes NF 324, TF 326 and TF 328. In AN 302 APb 306 includes NF 330, TF 332 and TF 334. In AN 302 APc 308 includes NF 336, TF 338 and TF 340.

An AT includes a:
Interface I_x presented to the mobile node (MN) for each NF in the active set.
Mobile node (MN) to support IP layer mobility at the access terminal.
APs communicate using a tunneling protocol defined over IP. The tunnel is an IP-in-IP tunnel for the data plane and an L2TP tunnel for the control plane.

Exemplary AT 303 includes a plurality of Interfaces (I_a 342, I_b 344, I_c 346) and MN 348. AT 303 can be, and sometimes is, coupled to AP_a 304 via wireless link 350. AT 303 can be, and sometimes is, coupled to AP_b 306 via wireless link 352. AT 303, can be, and sometimes is, coupled to AP_c 308 via wireless link 354.

FIG. 4 illustrates an exemplary network 400 including a distributed AN 402 and an AT 403.

In a centralized architecture shown in FIG. 4, the NF is no longer logically associated with a single TF, so the AN comprises network functions, access points and home agents. Exemplary AN 402 includes a plurality of NFs (404, 406, 408), a plurality of APs (AP_a 410, AP_b 412, AP_c 414), HA 416 and IP cloud 418. NF 404 is coupled to IP cloud 418 via link 420. NF 406 is coupled to IP cloud 418 via link 422. NF 408 is coupled to IP cloud 418 via link 424. IP cloud 418 is coupled to HA 416 via link 426. NF 404 is coupled to (AP_a 410, AP_b 412, AP_c 414) via links (428, 430, 432), respectively. NF 406 is coupled to (AP_a 410, AP_b 412, AP_c 414) via links (434, 436, 438), respectively. NF 408 is coupled to (AP_a 410, AP_b 412, AP_c 414) via links (440, 442, 444), respectively.

AP_a 410 includes TF 462 and TF 464. AP_b 412 includes TF 466 and TF 468. AP_c 414 includes TF 470 and TF 472.

Since an NF acts as the controller for a TF, and many NFs can be logically associated with a single TF, the NF controller for an AT, i.e., the NF communicating with an AT as a part of the active set, performs the functions of allocating, managing and tearing down resources for the TF at that AT. Therefore, multiple NFs may control resources at a single TF, although these resources are managed independently. In the example of FIG. 4, NF 408 is acting as an IAP for AT 403, as shown by the line 460.

The rest of the logical functions performed are the same as for the distributed architecture.

Exemplary AT 403 includes a plurality of Interfaces (I_a 446, I_b 448, I_c 450) and MN 452. AT 403 can be, and sometimes is, coupled to AP_a 410 via wireless link 454. AT 403 can be, and sometimes is, coupled to AP_b 412 via wireless link 456. AT 403 can be, and sometimes is, coupled to AP_c 414 via wireless link 458.

In systems like DO and 802.20, an AT obtains service from an AP by making an access attempt on an access channel of a particular sector (TF). The NF associated with the TF receiving the access attempt contacts the IAP that is the session master for the AT and retrieves a copy of the AT's session. (The AT indicates the identity of the IAP by including an UATI in the access payload. The UATI may be used as an IP address to directly address the IAP, or may be used to look up the address of the IAP.) On a successful access attempt, the AT is assigned air interface resources such as a MAC ID and data channels to communicate with that sector.

Additionally, the AT may send a report indicating the other sectors it can hear and their signal strengths. The TF receives the report and forwards it to a network based controller in the NF which in turn provides the AT with an active set. For DO and 802.20 as they are implemented today, there is exactly one NF that the AT can communicate with (except during an NF handoff when there are temporarily two). Each of the TFs in communication with the AT will forward the received data and signaling to this single NF. This NF also acts as a network-based controller for the AT and is responsible for negotiating and managing the allocation and tear down of resources for the AT to use with the sectors in the active set.

The active set is therefore the set of sectors in which the AT is assigned air interface resources. The AT will continue to send periodic reports and the network based controller may add or remove sectors from the active set as the AT moves around in the network.

NFs in the active set will also fetch a local copy of the session for the AT when they join the active set. The session is needed to communicate properly with the AT.

For a CDMA air link with soft handoff, on the uplink each of the sectors in the active set may try to decode an AT's transmission. On the downlink, each of the sectors in the active set may transmit to the AT simultaneously, and the AT combines the received transmissions to decode the packet.

For an OFDMA system, or a system without soft handoff, a function of the active set is to allow the AT to switch quickly between sectors in the active set and maintain service without having to make a new access attempt. An access attempt is generally much slower than a switch between members of the active set, since the active set member already has the session and the air interface resources assigned to the AT. Therefore, an active set is useful to do handoff without affecting the QoS service of active applications.

When, an AT and the session master in the IAP negotiate attributes, or alternatively the state of the connection changes, the new values for the attributes or the new state need to be distributed to each of the sectors in the active set in a timely manner to ensure optimal service from each sector. In some cases, for example if the type of headers changes, or security keys change, an AT may not be able to communicate at all with a sector until these changes are propagated to that sector. Thus every member of the active set should be updated when the session changes. Some changes may be less critical to synchronize than others.

There are three main types of state or context found in the network for an AT that has an active connection:

Data state is the state in the network on the data path between the AT and the IAP or an NF during a connection. Data state includes things such as header compressor state or RLP flow states which are very dynamic and difficult to transfer.

Session state is the state in the network on the control path between the AT and the IAP that is preserved when a connection is closed. Session state includes the value of the attributes that are negotiated between the AT and the IAP. These attributes affect the characteristics of the connection and the service received by the AT. For example, an AT may negotiate the QoS configuration for a new application and supply new filter and flow specifications to the network indicating the QoS service requirements for the application. As another example the AT may negotiate the size and type of the headers used in communication with the AN. The negotiation of a new set of attributes is defined as a session change.

Connection state is the state in the network on the control path between the AT and the IAP or an NF that is not preserved when a connection closes and the AT is idle. Connection state may include such information as power control loop values, soft handoff timing, and active set information.

In an IAP or L3 handoff the three types of state may need to be transferred between the old IAP and the new IAP. If only an idle AT can make an L3 handoff, then only the session state needs to be transferred. To support L3 handoff for an active AT, the data and connection state may also need to be transferred.

Systems like DO and 802.20, make L3 handoff of the data state simple by defining multiple routes (or data stacks), where the data state for each route is local to that route, i.e., the routes each have independent data state. By associating each IAP with a different route, the data state does not need to be transferred in a handoff. A further, even better step, is to associate each NF with a different route in which case L3 handoff is completely transparent to the data state, except for possible packet reordering.

Since the data state has multiple routes, the next logical step to support L3 handoff for an active AT is to move the control of the connection state from the IAP and make it local to each NF in the active set. This is done by defining multiple control routes (or control stacks) and defining the air interface so that the control stacks are independent and local to each NF. This may require that some of the negotiating and managing the allocation and tear down of resources of the connection state is transferred to the AT since there is no longer a single NF to manage all the members of the active set. It may also make some additional requirements on the air interface design to avoid a tight coupling between TFs—since different TFs may not share the same NF—in the active set. For instance, to operate in an optimal way, it is preferable to eliminate all tight synchronization between TFs that do not have the same NF, such as power control loops, soft handoff, etc.

Pushing the data and connection state down to the NFs eliminates the need to transfer this state on a L3 handoff, and also should make the NF-to-NF interface simpler.

The system therefore defines multiple independent data and control stacks (called interfaces in FIG. 3 and FIG. 4), in the AT to communicate with different NFs as needed, as well as the addressing mechanisms for the AT and TFs to logically distinguish between these stacks.

Fundamentally, some session state (QoS profile, security keys, attribute values, etc.) cannot be made local to an NF (or IAP) because it is too expensive to negotiate every time there is a NF (or a L3) handoff. Also the session state is relatively static and easy to transfer. What is needed are mechanisms to manage and update the session state as it changes and during IAP handoff where the session master moves.

Optimizing the session state transfer for L3 handoff is a useful feature for every system regardless of the network architecture since it simplifies network interfaces and should also improve the seamlessness of handoff.

A separate but related issue is the AT control of L3 handoff. Today, in systems like DO and 802.20, the AT is aware of the L3 handoff since it allocates and tears down local stacks, but it has no control of when L3 handoff occurs. This is called network-based mobility management. The question is whether to make AT the handoff controller, i.e., to use AT based mobility management?

To support fault tolerance and load balancing, the network needs either to be able to make the handoff or have a mechanism to signal to the AT to do a handoff. Thus if AT based mobility management is used, the network still needs a mechanism to indicate when it should occur.

AT based mobility management has some obvious advantages, such as allowing for a single mechanism for inter and intra technology, or global and local mobility. It also simplifies the network interfaces further by not requiring the network elements to determine when to do handoff.

The primary reason systems like DO and 802.20 use network based mobility is that AT based mobility is not optimized to work fast enough to support voice. A secondary reason is the tunneling overhead introduced by terminating the mobile IP tunnels (for MIPv6) in the AT. The mobility latency can be solved by forwarding data using tunnels between the current and previous forward link serving sector, as well as possibly using bicasting, where the data is sent to multiple NFs in the active set simultaneously.

In SimpleRAN, there are two types of handoff:

Layer 2 or L2 handoff refers to changing of the forward link or reverse link serving sector (TF).

L3 handoff refers to changing of the IAP,

L2 handoff should be as fast as possible in response to changing radio conditions. Systems like DO and 802.20 use PHY layer signaling to make L2 handoff fast.

L2 handoff is transfer of the serving sector TF for the forward (FL) or reverse (RL) links. A handoff occurs when the AT selects a new serving sector in the active set based on the RF conditions seen at the AT for that sector. The AT performs filtered measurements on the RF conditions for the forward and reverse links for all sectors in the active set. For instance, in 802.20 for the forward link the AT can measure the SINR on the acquisition pilots, the common pilot channel (if present), and the pilots on the shared signaling channel, to select its desired FL serving sector. For the reverse link, the AT estimates the CQI erasure rate for each sector in the active set based on the up/down power control commands to the AT from the sector.

L2 handoff is initiated when the AT requests a different FL or RL serving sector via a reverse link control channel. Dedicated resources are assigned at a TF when it is included in the active set for an AT. The TF is already configured to support the AT before the handoff request. The target serving sector detects the handoff request and completes the handoff with the assignment of traffic resources to the AT. The forward link TF handoff requires a round trip of messaging between the source TF or IAP and target TF in order to receive data for the target TF to transmit. For reverse link TF handoff, the target TF may immediately assign resources to the AT.

L3 handoff is the transfer of the IAP. L3 handoff involves a HA binding update with the new IAP and requires a session transfer to the new IAP for the control-plane. L3 handoff is asynchronous to L2 handoff in the system so that L2 handoff is not limited by MIPv6 handoff signaling speed.

L3 handoff is supported over the air in the system by defining an independent route to each NF. Each flow provides multiple routes for transmission and reception of higher layer packets. The route indicates which NF processed the packet. For example, one NF may be associated at the TF and over the air as Route A, while another NF may be associated with Route B. A serving TF can simultaneously send packets to an AT from both Route A and Route B. i.e., from both NFs, using a separate and independent sequence space for each.

There are two key ideas in the system design to ensure the QoS treatment for a mobile and its traffic is retained over each handoff mode:

Decoupling of L2 and L3 handoff

Reserving air interface resources and fetching the session at the target NF or TF before the handoff occurs to minimize the data flow interruption during the handoff. This is done by adding the target TF and NF to the active set.

The system is designed to separate L2 and L3 handoff in order to allow the system to support EF traffic during high rates of L2 handoff. L3 handoff requires a binding update, which is limited to a rate of 2 to 3 per second. In order to allow a faster L2 handoff rate of 20 to 30 Hz, L2 and L3 handoff are designed to be independent and asynchronous.

For L2 handoff, the active set management allows all the TFs in the active set to be configured and dedicated resources assigned in order to be ready to serve the AT in the event of an L2 handoff.

Consider a Mobile Wireless Communication System with multiple access points (AP) that provide service to access terminals (AT). Many systems have an active set, which is a set of APs that have assigned resources to the AT. At a given point in time, an AT may be within range of radio communication with one of the APs, or for the purpose of battery power optimization and radio interference reduction, may communicate only with one carefully selected AP (serving AP). The problem considered here is the delivery of signaling messages or data packets from a non-serving AP through a serving AP.

Radio Link Protocol (RLP): Each AP has an RLP, that fragments upper layer packets, and if needed retransmits the fragments. The RLP also adds its own header to each transmitted fragment. The AT has multiple instances of RLP, one for each AP that is in the active set.

Tunneling: A serving-AP receives packets from a non-serving AP via an inter-AP tunnel called the L2TP (layer 2 tunneling protocol) tunnel. The serving AP may deliver packets received on the tunnel by two alternate methods that use the following two bits.

Remote bit: The remote bit is part of the Packet Correlation Protocol (PCP) header. The PCP header is also sometimes called a MAC consolidation header. The remote bit is set by the transmitting PCP and processed by the receiving PCP. If the remote bit has value 1 (the bit is set) then the bit is followed by an AP address, and the receiving PCP passes the payload to the addressing layer. The addressing layer examines the address and forwards it to the addressed RLP. If the remote bit has value 0, the bit is not followed by an address and the receiving PCP passes the payload to the RLP of the serving AP.

Reprocess bit: The reprocess bit is part of each RLP payload. If the reprocess bit=1 (is set), the bit is followed by an AP address. If the reprocess bit is set the receiving RLP passes the reassembled packet to the addressing layer. The addressing layer examines the address and forwards it to the addressed RLP. If the reprocess bit is not set (bit=0), the receiving RLP passes the reassembled packet to the application (e.g. header decompressor or IP layer).

The decision for setting these bits is made by the serving AP (APb). For a packet that is received by APb from APa, there are the following two choices
1. Remote=1, Reprocess=0: In this case, the serving AP does not use it's RLP and does not fragment the packet. This case may be used if the packet received at APb from APa is small enough to fit in one MAC payload. The serving AP also inserts an address in the packet, and this is the address known to the serving AP because it received the packet through the L2TP tunnel.
2. Remote=0, Reprocess=1: In this case, the serving AP uses it's RLP and may fragment the packet. This case may be used if the packet received at APb from APa does not fit in one MAC payload. The serving AP also inserts an address in the packet, and this address is known to the serving AP because it received the packet through the L2TP tunnel.

Figure 5:
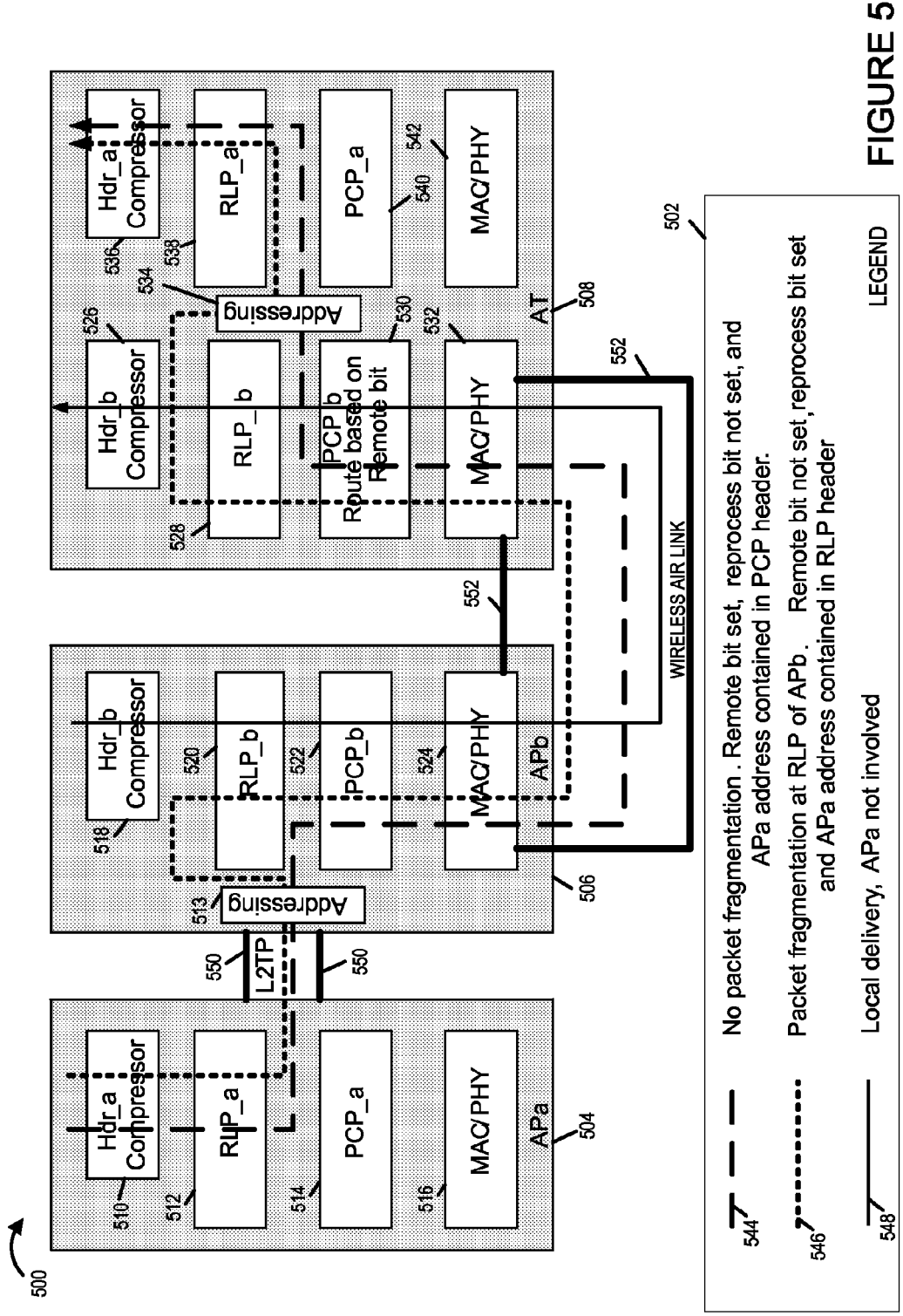
FIG. 5 is a drawing illustrating an exemplary communications system, different exemplary packets flows, and the drawing is used to describe remote and reprocess bit settings used in different flows.

FIG. 5 includes an exemplary communications system 500 and a corresponding legend 502. Exemplary communications system 500 includes a first access point APa 504, a second access point APb 506 and an access terminal AT 508. From the perspective of AT 508, currently, APb 506 is its serving, e.g., local, access point. There is a wireless air link 552 between APb 506 and AT 508. From the perspective of AT 508, currently, APa 504 is a remote access point. There is a Layer 2 Tunneling Protocol tunnel 550 between APa 504 and APb 506.

Access point a (APa) 504 includes a header a compressor module 510, a RLP_a module 512, a PCP_a module 514 and a MAC/PHY module 516. Access point b (APb) 506 includes a header_b compressor module 518, a RLP_b module 520, a PCP_b module 522 and a MAC/PHY module 524. Access Terminal (AT) 508 includes a header_b compressor module 526, a RLP_b module 528, a PCP_b module 530, a first MAC/PHY module 532, a header_a compressor module 536, a RLP_a module 538, a PCP_a module 540, and a second MAC/PHY module 542. It should be noted that PCP_b 530 routes based on the remote bit value included in the PCP header.

Legend 502 includes dashed line 544, dotted line 546 and solid line 548 used to illustrate packet flow for three different examples. Dashed line 544 represents flow for a case of: no packet fragmentation; the remote bit is set; the reprocess bit is not set; and APa address is contained in the PCP header. Dotted line 546 represents flow for a case of: packet fragmentation at the RLP 520 of AP_b 506; the remote bit is not set, the reprocess bit is set, and APa address is contained in the RLP header. Solid line 548 indicates a case of local delivery and APa 504 is not involved.

FIG. 5 explains the flow of fragments from a non-serving AP (APa 504) that are delivered through a serving AP (APb 506) and describes the flow of the packets depending on the setting of the above two bits. Each of the packets in this example are exchanged between APa 504 and the AT 508 through MAC/PHY 524 of APb 506 and through PCP 522 of APb 506.

Some features of various embodiments are:
1. Allows different versions of RLP to execute on different APs. In this case, effectively, one RLP is allowed to tunnel data to another RLP. For example, RLP_a 512 of APa 504 can tunnel data to RLP_b 520 of APb 506 via L2TP tunnel 550.
2. Facilitates partial packet progress during handoff. Consider the case when part of an IP (or other) packet has been served by APa 504 when handoff happened. Then, APa 504 wishes to deliver the remaining part of the packet to the AT 508. In this disclosure, APa 504 may send this remaining part to APb 506, and APb 506 may deliver it to the AT 508. At the AT 508, this remaining part of the packet flows after the addressing layer 534 to RLPa 538, where it is combined with the previously sent part.

The disclosure allows APb 506 to send only the unsent part of the packet, and the entire packet does not have to be sent from APb 506. This allows for more efficient use of bandwidth because no part of the packet is sent twice. Such partial packet progress is important when handoff is frequent and IP packets may be split into several MAC layer fragments.
3. Facilitates signaling messages to go from non-serving APs to the AT. Signaling messages generated at APa 504 can be delivered through APb 506, and this allows for efficient management of resources at the AP and AT 508.
4. Allows for two possible paths for tunneled packets: Packets received by a serving AP through the L2TP tunnel may be sent, e.g., by addressing module 513, through two separate paths, one using the RLP of the serving AP, and the other not using the RLP of the serving AP. For example the path corresponding to dotted line 546 uses the RLP_b 520 of serving APb 506, while the path corresponding to dashed line 544 does not use the RLP_b 520 of the serving APb 506.

Figure 6:
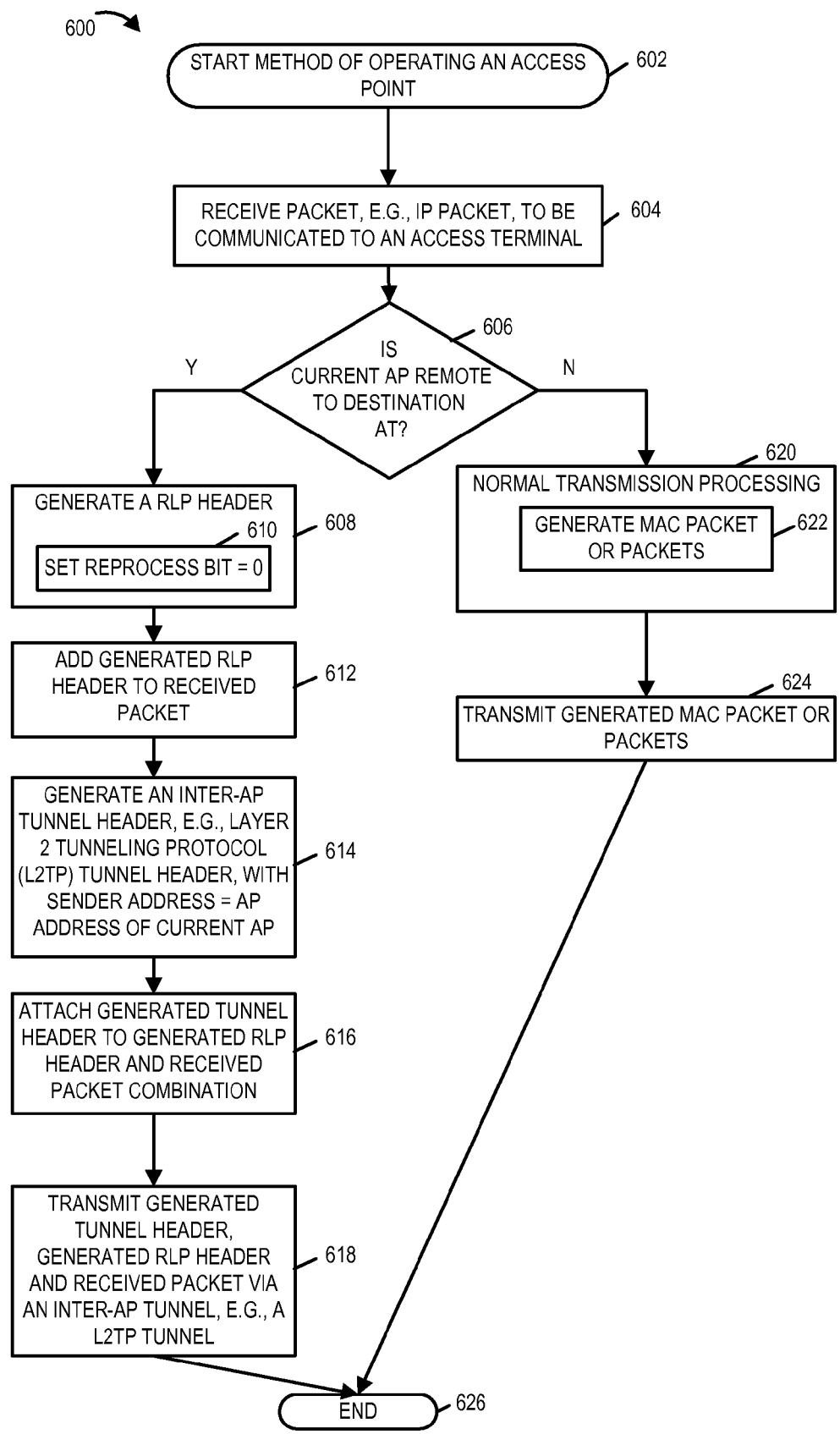
FIG. 6 is a flowchart of an exemplary method of operating an access point in accordance with various embodiments.

FIG. 6 is a flowchart 600 of an exemplary method of operating an access point (AP). The AP performing the steps of flowchart 600 is sometimes referred to as the current AP. Operation starts in step 602, where the access point is powered on and initialized. Operation proceeds from start step 602 to step 604. In step 604 the access point receives a packet, e.g., an IP packet, to be communicated to an access terminal (AT). Then, in step 606, the access point determines whether it is remote with respect to the destination access terminal for the received packet. If the AP is remote with respect to the destination AT, then operation proceeds from step 606 to step 608; otherwise, operation proceeds from step 606 to step 620.

In step 608, the AP generates an RLP header. Step 608 includes sub-step 610, in which the AP set a reprocess bit=0. Operation proceeds from step 608 to step 612, in which the AP adds the generated RLP header to the received packet. Operation proceeds from step 612 to step 614.

In step 614, the access point generates an inter-AP tunnel header, e.g., a Layer 2 Tunneling Protocol (L2TP) tunnel header, with the sender address equal to the AP address of the current AP. Operation proceeds from step 614 to step 616. In step 616 the access point attaches the generated tunnel header to the generated RLP header and received packet combination. Then, in step 618, the access terminal transmits the generated tunnel header, generated RLP header and received packet via an inter-AP tunnel, e.g., via a L2TP tunnel. In some embodiments, the destination at the other end of the tunnel is another AP, e.g., the serving AP for the AT to which the packet corresponds.

Returning to step 620, in step 620 the access point performs normal transmission processing. Step 620 includes sub-step 622 in which the access point generates the MAC packet or packets, and then in step 624 transmits the generated MAC packet or packets, e.g., via an airlink to the access terminal.

Operation proceeds from either step 618 or 624 to end step 626. The exemplary method of flowchart 600 is repeated for additional received radio link protocol packets which are to be communicated to an access terminal.

The access point performing the steps of flowchart 600 can be a remote access point or a serving, e.g., local, access point from the perspective of the access terminal to which the packet is to be communicated. In one example, the access terminal is AT 508 of FIG. 5.

Steps 606, 612, 614, 616, and 618 apply to the case where the access point performing the method of flowchart 600 is a remote access point from the perspective of the access terminal, and the remote access point communicates information to be communicated to the AT via a backhaul network using an inter-AP tunnel, e.g., a L2TP tunnel, e.g., communicating the packet to the AT's serving, e.g., local AP. In one such case the remote access point performing the method of flowchart 600 is remote APa 504 of FIG. 5. Steps 620 and 624 apply to the case where the access point performing the method of flowchart 600 is a serving, e.g., local, access point from the perspective of the access terminal, and the serving access point communicates information to the AT over a wireless link and the serving, e.g., local, AP does not use an inter-AP tunnel for such communication. In one such case the remote access point performing the method of flowchart 600 is serving, e.g., local APb 506 of FIG. 5.

Figure 7:
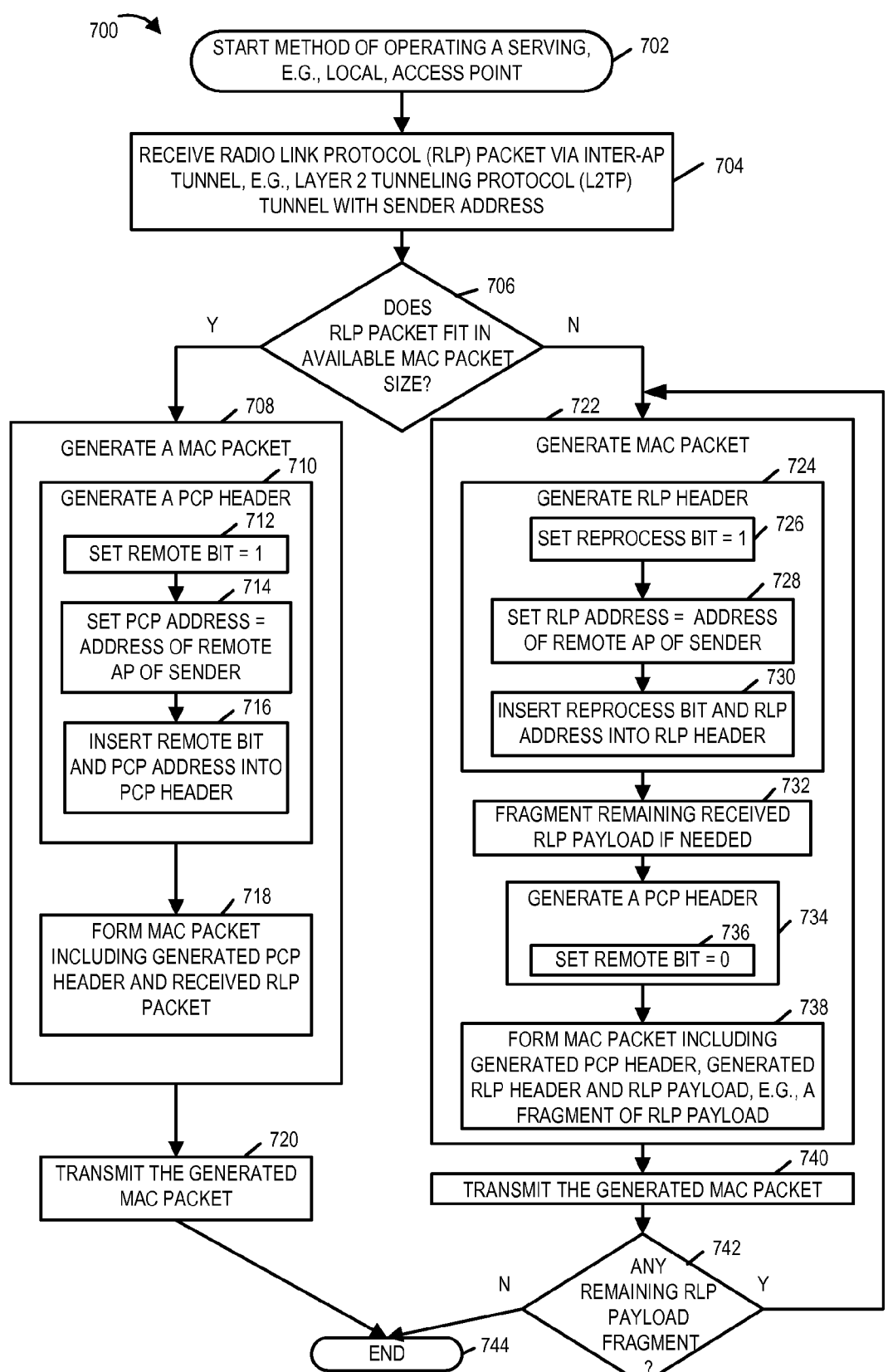
FIG. 7 is a flowchart of an exemplary method of operating a serving, e.g., local, access point in accordance with various embodiments.

FIG. 7 is a flowchart 700 of an exemplary method of operating a serving, e.g., local, access point. In start step 702, the serving access point is powered on and initialized. The access point is a serving access point from the perspective of access terminals which are using it as a current point of network attachment. Operation proceeds from start step 702 to step 704. In step 704, the serving access point receives a radio link protocol (RLP) packet via an inter-AP tunnel, e.g., a Layer 2 Tunneling Protocol (L2TP) tunnel with sender address. Operation proceeds from step 704 to step 706.

In step 706, the serving AP determines whether or not the received RLP packet fits in an available MAC size packet. If the received RLP packet fits in a single MAC packet then operation proceeds from step 706 to step 708. However, if the received RLP packet needs to be fragmented and portions communicated in different MAC packets, then operation proceeds from step 706 to step 722.

Returning to step 708, in step 708, the serving access point generates a MAC packet. Step 708 includes sub-steps 710 and 718. In sub-step 710, the serving access point generates a PCP header. Sub-step 710 includes sub-steps 712, 714 and 716. In sub-step 712, the serving access point sets a remote bit=1. Then, in sub-step 714, the serving AP sets a PCP address=address of the remote AP of the sender, and in sub-step 716, the serving access point inserts the remote bit and PCP address into the PCP header. Operation proceeds from sub-step 710 to sub-step 718. In sub-step 718, the serving access point forms a MAC packet including the generated PCP header and received RLP packet.

In step 720, the serving access point transmits the generated MAC packet, e.g., over a wireless airlink to an AT for which the packet is intended. Operation proceeds from step 720 to end step 744.

Returning to step 722, in step 722, the serving access point generates a MAC packet. Step 722 includes sub-steps 724, 732, 734 and 738. In sub-step 724, the serving access point generates an RLP header. Sub-step 724 includes sub-steps 726, 728 and 730. In sub-step 726, the serving access point sets a reprocess bit=1. Then in sub-step 728, the serving access point sets an RLP address=address of the remote AP of the sender. In sub-step 730, the serving access point inserts the reprocess bit of sub-step 726 and the RPL address of sub-step 728 into an RLP header. Operation proceeds from sub-step 724 to sub-step 732, in which the serving access point fragments the remaining received RLP payload if needed. Operation proceeds from sub-step 732 to sub-step 734, in which the serving access point generates a PCP header. Sub-step 734 includes sub-step 736, in which the serving access points sets a remote bit=0. Operation proceeds from sub-step 734 to sub-step 738.

In sub-step 738, the access point forms a MAC packet including the generated PCP header of sub-step 734, the generated RLP header of sub-step 724, and an RLP payload. The RLP payload is, e.g., a fragment of the RLP payload from the received RLP packet of step 704. Operation proceeds from step 722 to step 740. In step 740 the serving access point transmits the generated MAC packet of step 722, e.g., via a wireless airlink, to the access terminal for which the packet is intended. Operation proceeds from step 740 to step 742.

In step 742, the serving access point determines whether or not there are any remaining RLP payload fragments to be transmitted corresponding to the received RLP packet of step 704. If there are not more fragments, operation proceeds from step 742 to end step 744. If there are still RLP payload fragments to be communicated, then operation proceeds to step 722 for the generation of another MAC packet.

In step 744, operation terminates with regard to the method since the received radio link packet has been transmitted. The exemplary method of flowchart 700 is repeated for additional radio link protocol packets received over an inter AP tunnel, for which the access point is a serving access point.

FIG. 7 corresponds to an AT's serving AP receiving and processing information communicated over an inter-AP tunnel, e.g., a L2TP tunnel, generating one or more MAC packets, and transmitting the generated one or more MAC packets over a wireless communications link between the serving AP and the AT. For example, the AT is AT 508 of FIG. 5, and the serving AP performing the steps of flowchart 700 is APb 506 of FIG. 5 with respect to the tunneling cases.

Figure 8A:
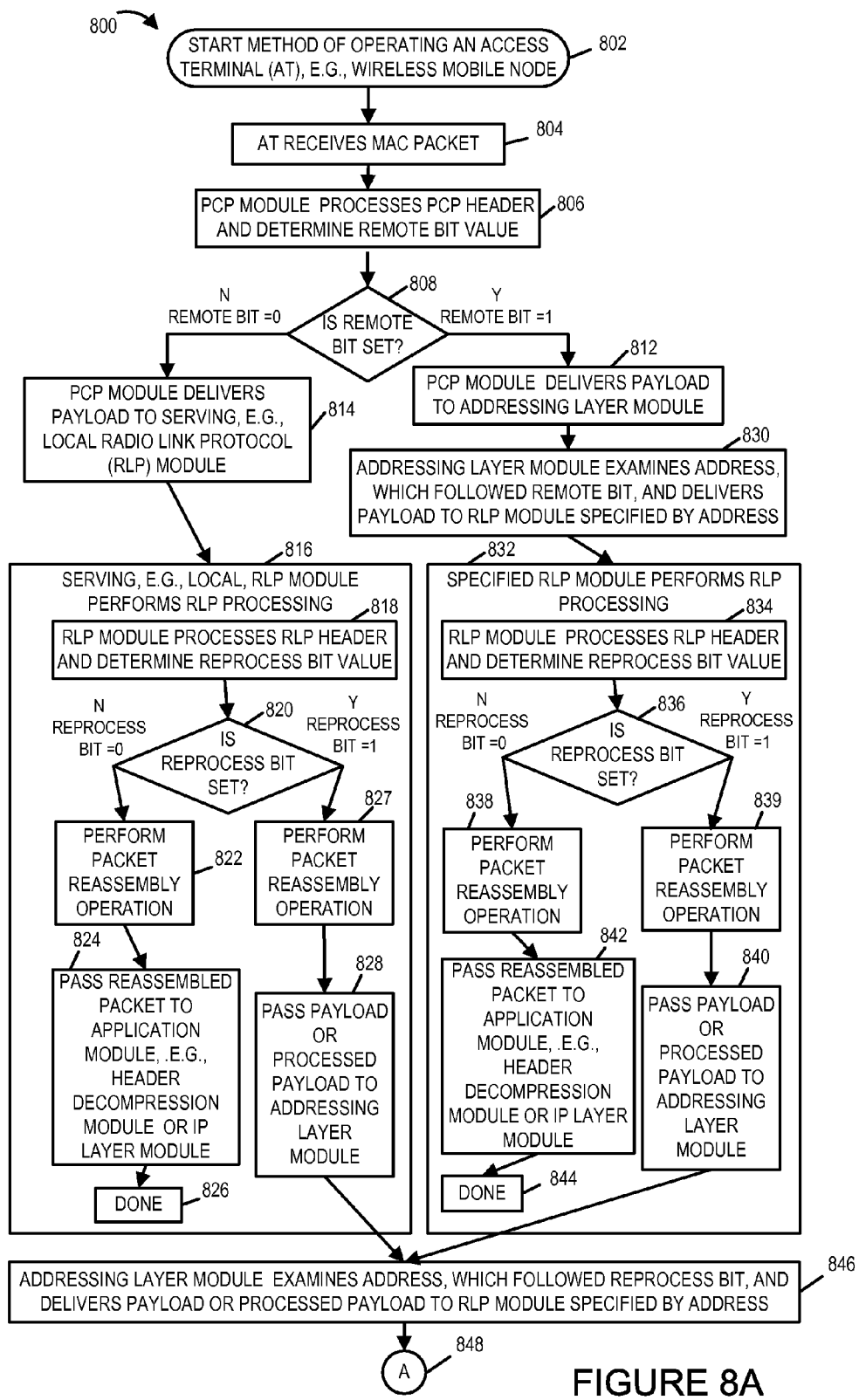
FIG. 8 comprising the combination of FIG. 8A
FIG. 8B is a flowchart of an exemplary method of operating an access terminal, e.g., wireless mobile node, in accordance with various embodiments.

FIG. 8 comprising the combination of FIG. 8A and FIG. 8B is a flowchart 800 of an exemplary method of operating an access terminal (AT), e.g., a wireless mobile node. Operation starts in step 802, where the access terminal is powered on and initialized. In start step 802, the access terminal establishes a wireless connection with an access point, e.g., its current serving access point. Operation proceeds from start step 802 to step 804.

In step 804, the access terminal receives a MAC packet. Then, in step 806 a PCP module of the access terminal processes a PCP header corresponding to the received MAC packet and determines a remote bit value conveyed in the PCP header. Operation proceeds from step 806 to step 808, where the access terminal proceeds along different operational flows as a function of the determined remote bit value from the PCP header. If the PCP module of the AT determines that the remote bit is not set (remote bit=0) then operation proceeds from step 808 to step 814. However, if the PCP module of the AT determines that the remote bit is set (remote bit=1), then operation proceeds from step 808 to step 812.

Returning to step 814, in step 814, the PCP module of the AT delivers the payload of the MAC packet to the serving, e.g. local, radio link protocol (RLP) module of the AT. Operation proceeds from step 814 to step 816. In step 816 the serving, e.g., local, RLP module performs RLP processing. Step 816 includes sub-steps 818, 820, 822, 824, 826, 827 and 828. In sub-step 818, the serving, e.g., local, RLP module processes the RLP header and determines the reprocess bit value. Next, in sub-step 820 the serving RLP processing module proceeds along different operation paths as a function of the determined reprocess bit value. In sub-step 820, if the reprocess bit is not set (reprocess bit=0), then operation proceeds from sub-step 820 to sub-step 822. However, if in sub-step 820 the reprocess bit is set (reprocess bit=1), then operation proceeds from sub-step 820 to sub-step 827.

Returning to sub-step 822, in sub-step 822 the serving RLP module performs a packet reassembly operation, and then in sub-step 824, the serving RLP module passes the reassembled packet to an application module, e.g., a header decompression module or IP layer module. Operation proceeds from sub-step 824 to end step 826.

Returning to sub-step 827, in sub-step 827 the serving RLP module of the AT performs a packet reassembly operation. Operation proceeds from sub-step 827 to sub-step 828. In sub-step 828 the serving RLP module of the AT passes the payload or processed payload to an addressing layer module of the AT.

Returning to step 812, in step 812, the PCP module of the AT delivers the payload of the MAC packet to the addressing layer module of the AT. Operation proceeds from step 812 to step 830. In step 830 the addressing layer module examines the address, which followed the remote bit, and delivers the payload to the RLP module specified by the address. Operation proceeds from step 830 to step 832. In step 832 the specified RLP module performs RLP processing. Step 832 includes sub-steps 834, 836, 838, 839, 840, 842 and 844. In sub-step 834 the specified RLP module processes the RLP header and determines the reprocess bit value. Next, in sub-step 836 the specified RLP processing module proceeds along different operation paths as a function of the determined reprocess bit value. In sub-step 836, if the reprocess bit is not set (reprocess bit=0), then operation proceeds from sub-step 836 to sub-step 838. However, if in sub-step 836 the reprocess bit is set (reprocess bit=1), then operation proceeds from sub-step 836 to sub-step 839.

Returning to sub-step 838, in sub-step 838 the specified RLP module performs a packet reassembly operation, and then in sub-step 842, the specified RLP module passes the reassembled packet to an application module, e.g., a header decompression module or IP layer module. Operation proceeds from sub-step 842 to end step 844.

Returning to sub-step 839, in sub-step 839, the serving RLP of the AT performs a packet reassembly operation. Operation proceeds from sub-step 839 to sub-step 840. In sub-step 840, the serving RLP module of the AT passes the payload or processed payload to an addressing layer module of the AT.

If operation had proceeded to sub-step 828 or sub-step 840, then operation proceeds to step 846. In step 846, the addressing layer module of the AT examines the address, which followed the reprocess bit, and delivers the payload or processed payload to the RLP module specified by the address. Operation proceeds from step 846 via connecting node A 848 to step 850. In step 850, the specified RLP module identified in step 846, performs a packet reassembly operation, e.g., combines a recovered packet fragment with any other previously recovered packet fragments conveyed by other MAC packets. Then, in step 852 the specified RLP module identified in step 846 determines if assembly of an upper level packet has been completed. Operation proceeds from step 852 to step 854.

In step 854, if the specified RLP module has completed reassembly of an upper level packet, e.g., an IP packet, then operation proceeds to step 856 where the specified RLP module passes the reassembled upper level packet to an application module, e.g., a header decompression module or an IP layer module. Operation proceeds from step 856 to end step 866.

Returning to step 854, in step 854 if the specified RLP module has not completed reassembly of an upper level packet, e.g., an IP packet, then operation proceeds to step 858, where the specified RLP module stores the recovered upper level packet fragment. Operation proceeds from step 858 to step 860, where the specified RLP module waits for additional corresponding packet fragments to arrive and be recovered. Then, in step 862, the specified RLP module reassembles the additional corresponding upper level packet fragment or fragments with the fragment of step 858 obtaining an upper level packet. Operation proceeds from step 862 to step 864 in which the specified RLP module passes the reassembled upper level packet to an application module, e.g., a header decompression module or an IP layer module. Operation proceeds from step 864 to end step 866.

FIG. 8 corresponds to access terminal operations including MAC packet reception, PCP processing, addressing layer module operations, RLP processing, and upper level packet reassembly operations. The exemplary AT, e.g., AT 508 of FIG. 5, includes a plurality of RLP modules, and utilizes one or more control bits, e.g., a remote bit and/or a reprocess bit and/or associated address in header fields, to determine which RLP module is to perform a packet reassembly operation. If a remote or reprocess bit is set to one, it is followed by an address field.

A reprocess bit=1 indicates that a higher level packet, e.g., an IP packet was fragmented by an RLP module in an AP. Different fragments are communicated via different MAC packets. The address associated with the reprocess bit does not identify which RLP module actually chopped up the higher level packet, but rather identifies the original source of the higher level packet. In some embodiments, a number of fragments=1 is also allowed. In such an embodiment, the reprocess bit can be set=1 with only one MAC packet communicated.

For an RLP packet sent and received via an L2TP tunnel, the reprocess bit will be set to zero since fragmentation has not yet occurred. If the serving AP's RLP then needs to perform fragmentation, the reprocess bit will be set to one for each new RLP packet header field within a MAC packet to be transmitted. Note that the reprocess bit corresponding to the RLP packet sent via the L2TP tunnel is different from the reprocess bit that the serving AP inserts.

A remote bit=1 and a reprocess bit=0 indicates that a higher level packet from a remote AP fit into a single MAC packet and is being communicated via a serving AP to the AT. With regard to the AT, the flow including steps 804, 806, 808, 812, 830, and 832 including sub-steps 834, 836, 838 and 842 corresponds to such a case.

A remote bit=0 and a reprocess bit=0 indicates that a higher level packet from the serving, e.g., local, AP, fit into a single MAC packet and is being communicated to the AT. With regard to the AT, the flow including steps 804, 806, 808, 814, and 816 including sub-steps 818, 820, 822 and 824 corresponds to such a case.

The path including steps 804, 806, 808, 814, 816 including sub-steps 818, 820, 827 and 828, 846, 848 and 850 can represent either remote AP sourced IP packet fragment recovery or local sourced IP packet fragment recovery, where the address following the reprocess bit identifies the source of the IP packet which was fragmented and is being reassembled.

Figure 9:
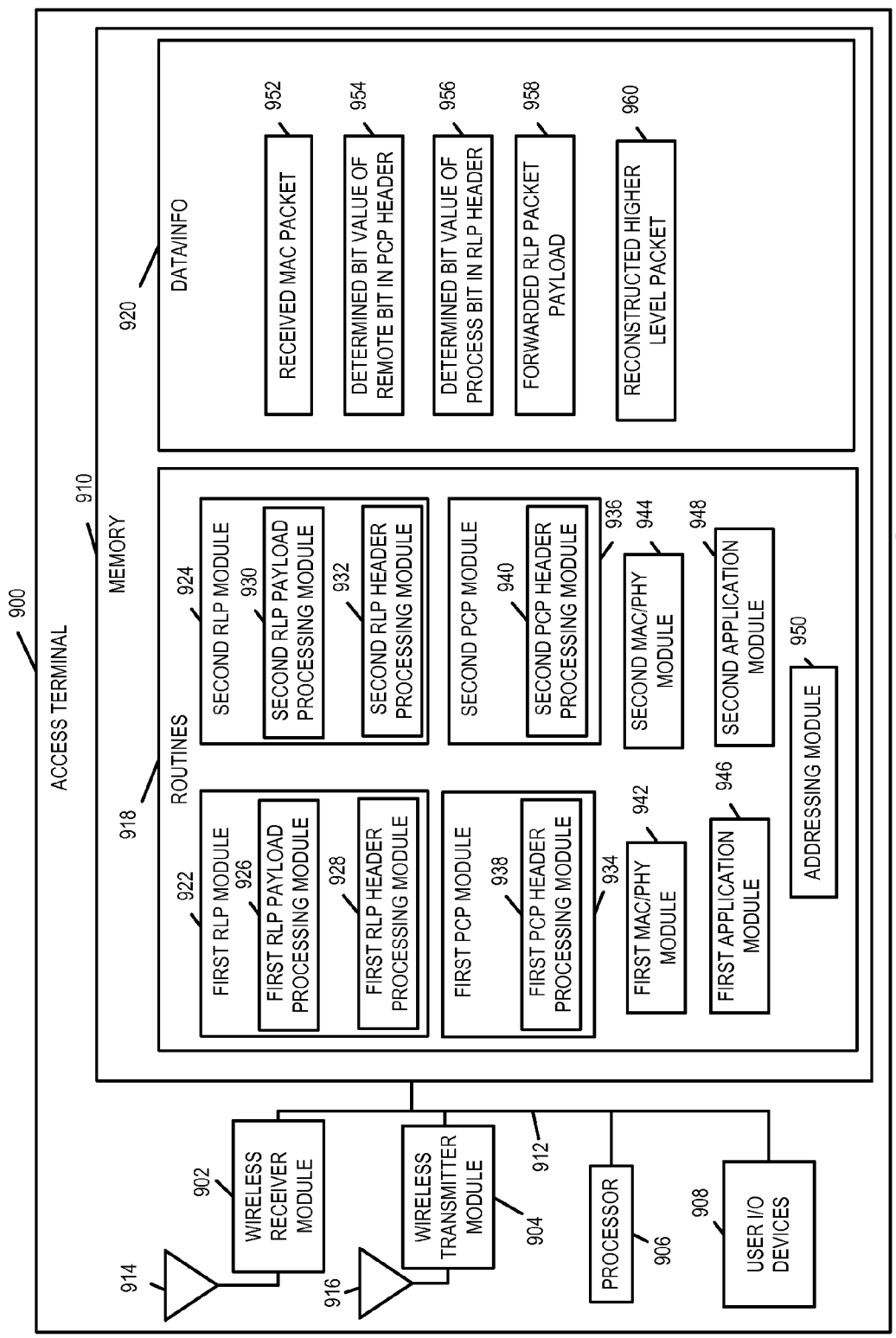
FIG. 9 is a drawing of an exemplary access terminal in accordance with various embodiments.

FIG. 9 is a drawing of an exemplary access terminal 900 in accordance with various embodiments. Exemplary access terminal 900 is, e.g., access terminal 508 of FIG. 5. Exemplary access terminal 900 includes a wireless receiver module 902, a wireless transmitter module 904, a processor 906, user I/O devices 908 and memory 910 coupled together via a bus 912 over which the various elements may interchange data and information. Memory 910 includes routines 918 and data/information 920. The processor 906, e.g., a CPU, executes the routines 918 and uses the data/information 920 in memory 910 to control the operation of the access terminal and implement methods, e.g., the methods of flowchart 800 of FIG. 8.

Wireless receiver module 902, e.g., a CDMA or OFDM receiver, is coupled to receive antenna 914 via which the access terminal 900 receives downlink signals from access points. Wireless receiver module 902 receives packets, e.g., obtaining received MAC packet 952. Wireless transmitter module 904, e.g., a CDMA or OFDM transmitter, is coupled to transmit antenna 916 via which the access terminal 900 transmits uplink signals to access points. Wireless transmitter module 904 transmits generated packets, e.g., generated MAC packets, over an airlink to an access point.

In some embodiments, the same antenna is used for transmission and reception. In some embodiments multiple antennas and/or multiple antenna elements are used for reception. In some embodiments multiple antennas and/or multiple antenna elements are used for transmission. In some embodiments at least some of the same antennas or antenna elements are used for both transmission and reception. In some embodiments, the access terminal uses MIMO techniques.

User I/O devices 908 include, e.g., microphone, keyboard, keypad, switches, camera, speaker, display, etc. User I/O devices 908 allow a user of access terminal 900 to input data/information, access output data/information, and control at least some functions of the access terminal 900, e.g., initiate a communications session with a peer node, e.g., another access terminal.

Routines 918 include a first RLP module 922, a second RLP module 924, a first PCP module 934, a second PCP module 936, a first MAC/PHY module 942, a second MAC/PHY module 944, a first application module 946, a second application module 948 and an addressing module 950. The first RLP module 922 includes a first RLP payload processing module 926 and a first RLP header processing module 928. The second RLP module 924 includes a second RLP payload processing module 930 and a second RLP header processing module 932. The first PCP module 934 includes a first PCP header processing module 938, and the second PCP module 936 includes a second PCP header processing module 940. Data/information 920 includes a received MAC packet 952, a determined bit value of remote bit in PCP header 954, a determined bit value of reprocess bit in RLP header 956, a forwarded RLP packet payload 958, and a reconstructed higher level packet 960.

The first RLP processing module 922 corresponds to a first access point, while the second RLP processing module 924 corresponds to a second access point. Addressing module 950 forwards packet payloads to one of the RLP payload processing modules (926, 930) based on the information communicated to said addressing module 950.

First PCP header processing module 938 determines, based on the value of an indicator value, e.g. a remote bit value, in a PCP header of a packet, e.g., a received MAC packet which was received over an airlink and processed by first MAC/PHY module 942, whether to forward the received RLP packet payload to its corresponding RLP payload processing module 926 or to forward the received RLP packet payload to the addressing module 950. Then the first PCP header processing module 938 executes the forwarding. For example, if the remote bit=1, an address follows the remote bit in the PCP header and the RLP packet payload is forwarded to the addressing module 950 along with the address. Alternatively, if the remote bit=0, the RLP packet payload is sent to the first RLP payload processing module 926.

Second PCP header processing module 940 determines, based on the value of an indicator value, e.g. a remote bit value, in a PCP header of a packet, e.g., a received MAC packet which was received over an airlink and processed by second MAC/PHY module 944, whether to forward the received RLP packet payload to its corresponding RLP payload processing module 930 or to forward the received RLP packet payload to the addressing module 950. Then the second PCP header processing module 932 executes the forwarding. For example, if the remote bit=1, an address follows the remote bit in the PCP header and the RLP packet payload is forwarded to the addressing module 950 along with the address. Alternatively, if the remote bit=0, the RLP packet payload is sent to the second RLP payload processing module 930.

First RLP header processing module 928 determines, based on the value of an indicator value, e.g. a reprocess bit value, in a RLP header of a packet, e.g., a RLP packet which was forwarded to first RLP module 922, whether to forward the received RLP packet payload to its payload processing module 926 or to forward the received RLP packet payload to the addressing module 950. Then the first RLP header processing module 928 executes the forwarding. For example, if the reprocess bit=1, an address follows the reprocess bit in the RLP header and the RLP packet payload is forwarded to the addressing module 950 along with the address. Alternatively, if the reprocess bit=0, the RLP packet payload is sent to the first RLP payload processing module 926 to perform a packet reassembly operation, e.g., to obtain a higher level packet, e.g., an IP packet which is passed to the first application module 946.

Second RLP header processing module 932 determines, based on the value of an indicator value, e.g. a reprocess bit value, in a RLP header of a packet, e.g., a RLP packet which was forwarded to second RLP module 924, whether to forward the received RLP packet payload to its payload processing module 930 or to forward the received RLP packet payload to the addressing module 950. Then the second RLP header processing module 932 executes the forwarding. For example, if the reprocess bit=1, an address follows the reprocess bit in the RLP header and the RLP packet payload is forwarded to the addressing module 950 along with the address. Alternatively, if the reprocess bit=0, the RLP packet payload is sent to the second RLP payload processing module 932 to perform a packet reassembly operation, e.g., to obtain a higher level packet, e.g., an IP packet which is passed to the second application module 948.

The first RLP module 922 may be associated with a first access point, e.g., a current serving access point for the access terminal with which the access terminal 900 has an active connection, while the second RLP module 924 may be associated with an access point with which the access terminal previously had an active connection.

Addressing module 950 forwards a packet payload to one of the RLP payload processing modules (926, 930) based on address information communicated to said addressing module 950.

Received MAC packet 952 is a packet which has been received by wireless receiver module 902 and processed through one or first and second MAC/PHY modules (942, 944). If the packet is processed through first MAC/PHY module 942 the packet is an input to first PCP module 934, while if the packet is processed through second MAC/PHY module 944, the packet is an input to second PCP module 936.

Determined bit value of remote bit value in PCP header 954 is obtained and used by a PCP header routing module (938, 940) to determine packet payload routing. Determined bit value of reprocess bit value in RLP header 956 is obtained and used by a RLP header routing module (928, 932) to determine packet payload routing. Forwarded RLP packet payload 958 is a RLP packet payload forwarded by one of a PCP header module (938, 940), a RLP header processing module (928, 930), or addressing module 950. Reconstructed higher level packet 960 is, e.g., an IP packet, which had been reconstructed by processing of one of the RLP payload processing modules (926, 930), e.g., by reassembly higher level packet fragments conveyed in one or more RLP packet payloads. The reconstructed higher level packet 960 is forwarded to an application module (946, 948).

Figure 10:
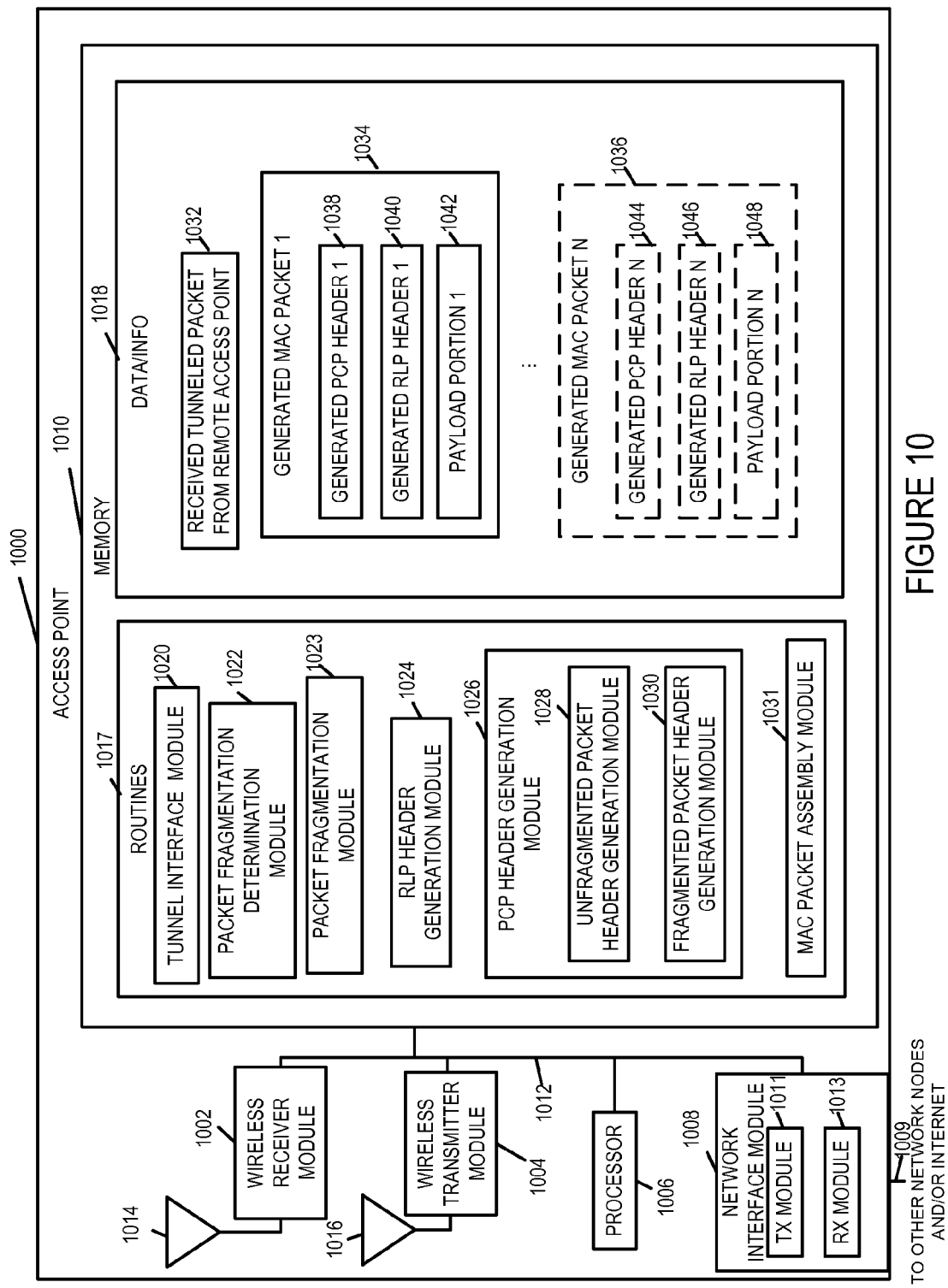
FIG. 10 is a drawing of an exemplary access point in accordance with various embodiments.

FIG. 10 is a drawing of an exemplary access point 1000 in accordance with various embodiments. Exemplary access point 1000 is, e.g., serving, e.g., local, access point 506 of FIG. 5. Exemplary access point 1000 includes a wireless receiver module 1002, a wireless transmitter module 1004, a processor 1006, a network interface module 1008 and memory 1010 coupled together via a bus 1012 over which the various elements may interchange data and information. Memory 1010 includes routines 1017 and data/information 1018. The processor 1006, e.g., a CPU, executes the routines 1017 and uses the data/information 1018 in memory 1010 to control the operation of the access point 1000 and implement methods, e.g., the methods of flowchart 700 of FIG. 7.

Wireless receiver module 1002, e.g., an OFDM or CDMA receiver, is coupled to receive antenna 1014 via which the access point receives uplink signals from access terminals. Wireless transmitter module 1004, e.g., an OFDM or CDMA transmitter, is coupled to transmit antenna 1016, via which the access point transmits downlink signals to access terminals. Wireless transmitter module 1004 transmits a packet over an airlink including an RLP header generated by RLP header generation module 1024 and at least a portion of a tunneled packet, e.g., one of the packets being transmitted over the airlink being generated MAC packet 1 1034.

In some embodiments, the same antenna is used for transmission and reception. In some embodiments multiple antennas and/or multiple antenna elements are uses for reception. In some embodiments multiple antennas and/or multiple antenna elements are uses for transmission. In some embodiments at least some of the same antennas or antenna elements are used for both transmission and reception. In some embodiments, the access point uses MIMO techniques.

Network interface module 1008 is coupled to other network nodes, e.g., other access points, AAA node, home agent node, etc, and/or the Internet via network link 1009. Network interface module 1008 includes a transmission module 1011 and a receiver module 1013.

Routines 1017 include a tunnel interface module 1020, a packet fragmentation determination module 1022, a packet fragmentation module 1023, an RLP header generation module 1024, a PCP header generation module 1026 and a MAC packet assembly module 1031. PCP header generation module 1026 includes an unfragmented packet header generation module 1028 and a fragmented packet header generation module 1030. Data/information 1018 includes a received tunneled packet from a remote access point 1032 and one or more generated MAC packets (generated MAC packet 1 1034, . . . , generated MAC packet N 1036). The generated MAC packets (1034, . . . , 1036) carry payload information from the received tunneled packet 1032. Generated MAC packet 1 1034 includes a generated PCP header 1 1038, a generated RLP header 1 1040, and a payload portion 1 1042. Generated MAC packet N 1036 includes a generated PCP header N 1044, a generated RLP header N 1046, and a payload portion N 1048.

Tunnel interface module 1020 receives tunneled packets from another access point. The tunneled packet is conveyed via network link 1009 through receiver module 1013 of network interface module 1008 to tunnel interface module 1020. Exemplary received tunnel packet from remote access terminal 1032 is a packet received by tunnel interface module 1020.

Packet fragmentation determination module 1022 determines if packet fragmentation is to be performed on the content of a tunneled packet. Packet fragmentation module 1023 fragments packets which the packet fragmentation determination module 1022 determine to be too large to fit into a single MAC packet.

RLP header generation module 1024, which is coupled to the packet fragmentation module 1023, generates an RLP header including a value indicating the presence of an address to be used for routing an RLP packet payload to an RLP module. For example, the generated RLP header includes a reprocess bit which is set to one and also includes an address following the reprocess bit.

Unfragmented packet header generation module 1028 generates PCP headers corresponding to packets which were not subject to fragmentation, said PCP unfragmented packet generation module 1028 generating a PCP header including a value indicating the presence of an address to be used for routing payloads to an RLP processing module and ii) an address value when a portion of a tunneled packet which has not been fragmented is to be transmitted. For example, the unfragmented header generation module 1028 generates a PCP header including a remote bit=1 followed by an address. In various embodiments, the address included in the PCP header when the included value indicates the presence of an address, e.g., remote bit=1, corresponds to a second access point, e.g., a remote access point, which was the source of a tunneled packet which provided information being transmitted with said generated PCP header.

Fragmented packet header generation module 1030 generates PCP headers corresponding to portions of packets which resulted from fragmentation, said PCP fragmented packet header generation module 1030 generating PCP headers including a value indicating the absence, from the PCP header of an address used for routing a payload to an RLP processing module. For example, the fragmented header generation module 1030 generates a PCP header including a remote bit=0.

MAC packet assembly module 1031 assembles generated elements, e.g., a generated RLP header, a generated PCP header and payload portion, e.g., a fragmented payload portion, into a MAC packet. Generated MAC packet 1 1034 and generated MAC packet N 1036 represent exemplary assembled MAC packets which are transmitted by wireless transmitter module 1004.

Figure 11:
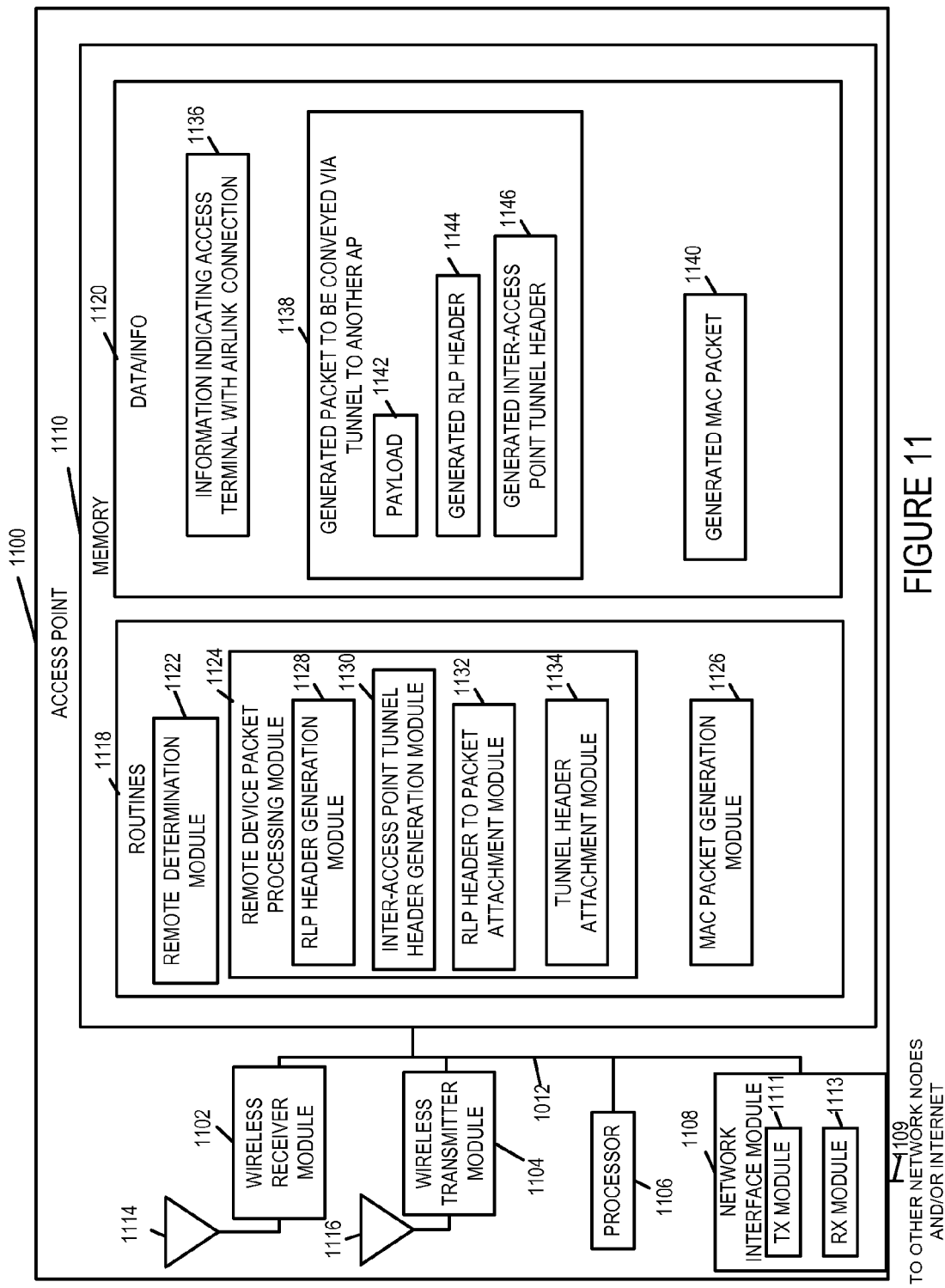
FIG. 11 is a drawing of an exemplary access point in accordance with various embodiments.

FIG. 11 is a drawing of an exemplary access point 1100 in accordance with various embodiments. Exemplary access point 1100 is, e.g., remote access point 504 of FIG. 5. Access point 1100 is, e.g., coupled to a second access point, the second access point having an airlink connection with an access terminal. The second access point is, e.g., access point 506 of FIG. 5, and the access terminal is, e.g., access terminal 508 of FIG. 5.

Exemplary access point 1100 includes a wireless receiver module 1102, a wireless transmitter module 1104, a processor 1106, a network interface module 1108 and memory 1110 coupled together via a bus 1112 over which the various elements may interchange data and information. Memory 1110 includes routines 1118 and data/information 1120. The processor 1106, e.g., a CPU, executes the routines 1118 and uses the data/information 1120 in memory 1110 to control the operation of the access point 1100 and implement methods, e.g., the methods of flowchart 600 of FIG. 6.

Wireless receiver module 1102, e.g., an OFDM or CDMA receiver, is coupled to receive antenna 1114 via which the access point receives uplink signals from access terminals, e.g. access terminals which are local. Wireless transmitter module 1104, e.g., an OFDM or CDMA transmitter, is coupled to transmit antenna 1116, via which the access point transmits downlink signals to access terminals, e.g., access terminal which are local and with which the access point is acting as a serving access point. Wireless transmitter module 1104 transmits a packet, e.g., generated MAC packet 1140, which has been generated by MAC packet generation module 1126, to an access terminal using access point 1100 via a wireless airlink connection.

In some embodiments, the same antenna is used for transmission and reception. In some embodiments multiple antennas and/or multiple antenna elements are uses for reception. In some embodiments multiple antennas and/or multiple antenna elements are uses for transmission. In some embodiments at least some of the same antennas or antenna elements are used for both transmission and reception. In some embodiments, the access point uses MIMO techniques.

Network interface module 1108 is coupled to other network nodes, e.g., other access points, AAA node, home agent node, etc, and/or the Internet via network link 1109. Network interface module 1108 includes a transmission module 1111 and a receiver module 1113. Transmission module 1111 transmits a generated tunneled packet, e.g., packet 1138, to a second access point.

Routines 1118 include a remote determination module 1122, a remote device packet processing module 1124 and a MAC packet generation module 1126. Remote device packet processing module 1124 includes an RLP header generation module 1128, an inter-access point tunnel header generation module 1130, a RLP header to packet attachment module 1134, and a tunnel header attachment module 1134. Data/information 1120 includes information indicating access terminals with an airlink connection 1136, a generated packet to be conveyed via a tunnel to another AP 1138, and a generated MAC packet 1140.

Remote determination module 1122 determines if the access point 1100 has an airlink connection with an access terminal to which a packet is to be communicated. Remote device packet processing module 1124 generates a tunneled packet to be communicate information to an access terminal with which access point 1100 does not have an airlink connection. MAC packet generation module 1126 generates a MAC packet to communicate information to an access terminal with which the access point 1100 has an airlink connection. Information 1136, indicating access terminals with which access point 1000 has an active connection, e.g., a maintained list of active connections, is used by remote determination module 1122.

RLP header generation module 1128 generates an RLP header including a value set to indicate that an address to be used for routing an RLP payload is not included in the generated RLP packet header, e.g., a reprocess bit is set=0 in a generated RLP header. Inter-access point tunnel header generation module 1130 generates a tunnel packet header used for tunneling an RLP packet including a packet to be communicated to a second access point for transmission to an access terminal. The generated inter-access point tunnel header includes address information identifying access point 1100 as the source of the information to be conveyed to the access terminal. The tunnel is, e.g., a layer 2 tunneling protocol (L2TP) tunnel.

RLP header to packet attachment module 1132 attaches a generated RLP header to a packet to be communicated to generate a combined RLP header and packet. Tunnel header attachment module 1134 attaches a generated inter-access point tunnel header generated by the inter-access point tunnel header generation module 1130 to the combined RLP header and packet to generate a tunneled packet, e.g., generated packet 1138 to be conveyed via a tunnel to another access point.

MAC packet generation module 1126 generates MAC packets corresponding to packets to be communicated to access terminal with which said access point 1100 has an active wireless connection.

In various embodiments, nodes described herein are implemented using one or more modules to perform the steps corresponding to one or more methods of the aspect, for example, signal processing, message generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, compact disc, DVD, etc. to control a machine, e.g., general purpose computer with or without additional hardware, to implement all or portions of the above described methods, e.g., in one or more nodes. Accordingly, among other things, the aspect is directed to a machine-readable medium including machine executable instructions for causing a machine, e.g., processor and associated hardware, to perform one or more of the steps of the above-described method(s).

In various embodiments nodes described herein are implemented using one or more modules to perform the steps corresponding to one or more methods, for example, signal processing, message generation and/or transmission steps. Some exemplary steps include transmitting a connection request, receiving a connection response, updating a set of information indicating an access point with which an access terminal has an active connection, forwarding a connection request, forwarding a connection response, determining resource assignment, requesting resources, updating resources, etc. In some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, compact disc, DVD, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s).

In some embodiments, the processor or processors, e.g., CPUs, of one or more devices, e.g., communications devices such as access terminals and/or access points, are configured to perform the steps of the methods described as being performed by the communications device. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

Numerous additional variations on the methods and apparatus described above will be apparent to those skilled in the art in view of the above descriptions. Such variations are to be considered within scope. The methods and apparatus of various embodiments may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of various embodiments.

What is claimed is:

1. A method of operating an access terminal, the method comprising:
    examining an RLP (Radio Link Protocol) header of an RLP packet to determine if a reprocess indicator value in said RLP header has been set, wherein the reprocess indicator value specifies how to route the RLP packet by the access terminal; and
    if it is determined by the access terminal that said reprocess indicator has been set:
        i) passing a payload corresponding to said indicator value to an addressing layer module of the access terminal; and
        ii) operating the addressing layer module to deliver the payload corresponding to said indicator value to an RLP module corresponding to an address value included in said RLP packet with said reprocess indicator, wherein said RLP module corresponds to a remote access point with which said access terminal does not currently have an active airlink connection; and
    if it is determined that said reprocess indicator has not been set, passing the payload corresponding to said indicator value to a default RLP module.

2. The method of claim 1, wherein if it is determined that said reprocess indicator has been set further performing the step of:
    operating the RLP module indicated by the address included in said RLP packet to perform a packet reassembly operation.

3. The method of claim 2, wherein said RLP module specified by the address value included in said RLP packet is an RLP module corresponding to the remote access point with which said access terminal does not currently have the active airlink connection.

4. The method of claim 2, wherein if it is determined that said reprocess indicator has been set further performing the step of:
    operating the RLP module indicated by the address included in said RLP packet to determine if said packet reassembly operation results in completion of an assembly of a higher level packet; and
    if it is determined that the packet reassembly operation has resulted in completion of the assembly of a higher level packet, passing the reassembled higher level packet to a higher level packet processing module for further processing.

5. The method of claim 4, wherein said higher level packet processing module is one of a decompression module and IP layer module.

6. The method of claim 1, wherein if it is determined that said reprocess indicator has not been set further performing the step of:
    operating the default RLP module to perform a packet reassembly operation using the payload corresponding to the indicator value.

7. The method of claim 6, wherein said default RLP module is an RLP module corresponding to a serving access point with which said access terminal has a wireless communications link.

8. The method of claim 6, further comprising, prior to examining the RLP header of the RLP packet, receiving a MAC packet; and determining if a (packet correlation protocol) header corresponding to said (Medium Access Controller) packet includes an indicator value in said PCP header indicating that an address corresponding to an RLP module to be used in processing said MAC packet is present.

9. The method of claim 8, further comprising:
when it is determined that the PCP header corresponding to said MAC packet includes the indicator value indicating that the address corresponding to an RLP module to be used is present, delivering the payload of said MAC packet to the RLP module corresponding to the address in the PCP header for RLP processing.

10. The method of claim 9, further comprising:
when it is determined that the PCP header corresponding to said MAC packet does not include the indicator value indicating that the address corresponding to the RLP module to be used is present, delivering the payload of said MAC packet to the default RLP module corresponding to an access point that transmitted the MAC packet.

11. The method of claim 9, wherein said indicator value in said PCP header is included in a field of said PCP header.

12. An access terminal comprising a plurality of modules implemented using computer-readable instructions stored in a non-transitory machine readable medium, the modules comprising:
a first RLP payload processing module corresponding to a first access point, wherein said first access point is a serving access point with which said access terminal has an active connection;
a second RLP payload processing module corresponding to a second access point;
an addressing module for forwarding packet payloads to one of said RLP payload processing modules based on address information communicated to said addressing module;
a header processing module for determining, based on a routing address indicator value included in the header, whether the header includes an address used for routing an RLP packet payload and forwarding the packet payload to said addressing module when the indicator value indicates that an address used for routing RLP packet payloads is included.

13. The access terminal of claim 12, wherein said header processing module is an RLP header processing module for processing the RLP header.

14. The access terminal of claim 12 wherein said header processing module is a PCP header processing module.

15. The access terminal of claim 12, wherein said second access point is an access point with which said access terminal previously had an active wireless connection.

16. An access terminal comprising:
a wireless receiver means for receiving RLP (Radio Link Protocol) packets from an access network, wherein an RLP packet comprises a header and a payload;
first RLP payload processing means for performing RLP processing corresponding to a first access point, wherein said first access point is a serving access point with which said access terminal has an active connection;
second RLP payload processing means for performing RLP processing corresponding to a second access point;
addressing means for forwarding packet payloads to one of said first and second RLP payload processing means based on address information communicated to said addressing means;
header processing means for determining, based on a routing address indicator value included in a header, whether the header includes an address used for routing an RLP packet payload and forwarding the packet payload to said addressing means when the indicator value indicates that an address used for routing RLP packet payloads is included.

17. The access terminal of claim 16, wherein said header processing means is an RLP header processing module for processing the RLP header.

18. The access terminal of claim 16, wherein said header processing means is a PCP header processing module.

19. The access terminal of claim 16, wherein said second access point is an access point with which said access terminal previously had an active wireless connection.

20. An apparatus comprising:
a processor for use in an access terminal, the processor configured to:
examine an RLP (Radio Link Protocol) header of an RLP packet to determine if a reprocess indicator value in said RLP header has been set, wherein the reprocessing indicator value specifies how to route the RLP packet by the access terminal; and
if it is determined that said reprocess indicator has been set:
i) pass a payload corresponding to said indicator value to an addressing layer module; and
ii) operate the addressing layer module to deliver the payload corresponding to said indicator value to an RLP module corresponding to an address value included in said RLP packet with said reprocess indicator, wherein said RLP module corresponds to a remote access point with which said access terminal does not currently have an active airlink connection; and
if it is determined that said reprocess indicator has not been set, pass the payload corresponding to said indicator value to a default RLP module.

21. The apparatus of claim 20, wherein the processor is further configured to, if it is determined that said reprocess indicator has been set:
operate the RLP module indicated by the address included in said RLP packet to perform a packet reassembly operation.

22. The apparatus of claim 21, wherein the processor is further configured to, if it is determined that said reprocess indicator has not been set:
pass the payload corresponding to said indicator value to the default RLP module.

23. The apparatus of claim 21, wherein the processor is further configured to:
prior to examining the RLP header of the RLP packet, receive a MAC packet; and
determine if a PCP header corresponding to said MAC packet includes an indicator value in said PCP header indicating that an address corresponding to an RLP module to be used in processing said MAC packet is present.

24. A non-transitory computer readable medium embodying machine executable instructions for controlling an access terminal to implement a method of communicating with other communications devices, the method comprising:
examining an RLP (Radio Link Protocol) header of an RLP packet to determine if a reprocess indicator value in said RLP header has been set, wherein the reprocessing indicator value specifies how to route the RLP packet by the access terminal; and if it is determined that said reprocess indicator has been set:
  i) passing a payload corresponding to said indicator value to an addressing layer module; and
  ii) operate the addressing layer module to deliver the payload corresponding to said indicator value to an RLP module corresponding to an address value included in said RLP packet with said reprocess indicator, wherein said RLP module corresponds to a remote access point with which said access terminal does not currently have an active airlink connection; and if it is determined that said reprocess indicator has not been set, passing the payload corresponding to said indicator value to a default RLP module.

25. The non-transitory readable medium of claim 24, further embodying machine executable instructions for, if it is determined that said reprocess indicator has been set, performing the step of:
  operating the RLP module indicated by the address included in said RLP packet to perform a packet reassembly operation.

26. The non-transitory readable medium of claim 25, wherein said RLP module specified by the address value included in said RLP packet is an RLP module corresponding to a remote access point with which said access terminal does not currently have an active airlink connection.

27. The non-transitory readable medium of claim 25, further embodying machine executable instructions for, if it is determined that said reprocess indicator has not been set:
  passing the payload corresponding to said indicator value to a default RLP module.

28. The non-transitory readable medium of claim 25, further embodying machine executable instructions for,
  prior to examining the RLP header of the RLP packet, receiving a MAC packet; and
  determining if a PCP header corresponding to said MAC packet includes an indicator value in said PCP header indicating that an address corresponding to an RLP module to be used in processing said MAC packet is present.

* * * * *